US009223067B2

(12) United States Patent
Hiratsuka et al.

(10) Patent No.: US 9,223,067 B2
(45) Date of Patent: Dec. 29, 2015

(54) DISPLAY DEVICE AND THIN FILM POLARIZER USED FOR DISPLAY DEVICE

(71) Applicants: Japan Display Inc., Tokyo (JP); Panasonic Liquid Crystal Display Co., Ltd., Himeji-shi (JP)

(72) Inventors: Takato Hiratsuka, Chiba (JP); Masaya Adachi, Hitachi (JP); Hiroshi Sasaki, Mito (JP); Miharu Otani, Chiba (JP)

(73) Assignees: JAPAN DISPLAY INC., Tokyo (JP); PANASONIC LIQUID CRYSTAL DISPLAY CO., LTD., Hyogo-Ken (JP)

(*) Notice: Subject to any disclaimer, the term of this patent is extended or adjusted under 35 U.S.C. 154(b) by 0 days.

(21) Appl. No.: 14/581,530

(22) Filed: Dec. 23, 2014

(65) Prior Publication Data

US 2015/0103295 A1 Apr. 16, 2015

Related U.S. Application Data

(63) Continuation of application No. 13/022,774, filed on Feb. 8, 2011, now Pat. No. 8,922,738.

(30) Foreign Application Priority Data

Feb. 8, 2010 (JP) .................................. 2010-025444

(51) Int. Cl.
G02F 1/1335 (2006.01)
G02B 5/30 (2006.01)
G02B 5/20 (2006.01)

(52) U.S. Cl.
CPC ............ G02B 5/3016 (2013.01); G02B 5/3033 (2013.01); G02F 1/133528 (2013.01); *G02B 5/201* (2013.01)

(58) Field of Classification Search
USPC ........................................................ 349/96
See application file for complete search history.

(56) References Cited

U.S. PATENT DOCUMENTS

2007/0024970 A1* 2/2007 Lub et al. ...................... 359/487
2008/0143939 A1 6/2008 Adachi et al.
(Continued)

FOREIGN PATENT DOCUMENTS

JP 2008-151817 7/2008
JP 2008-241773 10/2008
(Continued)

OTHER PUBLICATIONS

U.S. Appl. No. 12/805,841, filed Aug. 20, 2010, Adachi et al.
(Continued)

*Primary Examiner* — Eric Wong
(74) *Attorney, Agent, or Firm* — Lowe Hauptman & Ham, LLP

(57) ABSTRACT

A display device includes a first substrate, a second substrate, a first polarization element film which is directly formed on a surface of the second substrate on a side opposite to a side where the first substrate is arranged, and a first polarization layer which is formed in contact with a surface of the first polarization element film on a side opposite to a side where the second substrate is arranged. The first polarization element film is made of an aligned lyotropic liquid crystal material, and the first protective layer is made of a material having a refractive index smaller than a refractive index of the first polarization element film in a transmission axis direction, and has a thickness smaller than a thickness of the first polarization element film.

6 Claims, 13 Drawing Sheets

(56) References Cited

U.S. PATENT DOCUMENTS

| | | |
|---|---|---|
| 2008/0239210 A1 | 10/2008 | Araki et al. |
| 2009/0153781 A1 | 6/2009 | Otani et al. |
| 2009/0225260 A1 | 9/2009 | Adachi et al. |
| 2010/0002173 A1 | 1/2010 | Otani et al. |
| 2010/0171906 A1 | 7/2010 | Sakai |
| 2010/0231830 A1* | 9/2010 | Hirakata et al. ............... 349/85 |
| 2010/0259708 A1 | 10/2010 | Hiratsuka et al. |
| 2011/0007243 A1 | 1/2011 | Tanaka et al. |

FOREIGN PATENT DOCUMENTS

| | | |
|---|---|---|
| JP | 2009-132748 | 6/2009 |
| JP | 2009-145745 | 7/2009 |
| JP | 2009-199075 | 9/2009 |
| JP | 2009-207203 | 9/2009 |
| JP | 2009-210752 | 9/2009 |
| JP | 2010-15019 | 1/2010 |
| JP | 2010-250025 | 11/2010 |
| JP | 2011-17805 | 1/2011 |

OTHER PUBLICATIONS

Alexander Lazarev et al.; P-113: Materials for Light Efficient LCD, Symposium Digest of Technical Papers, Jun. 2009, pp. 1552-1554, vol. 40, Issue 1.

* cited by examiner

FIG.14
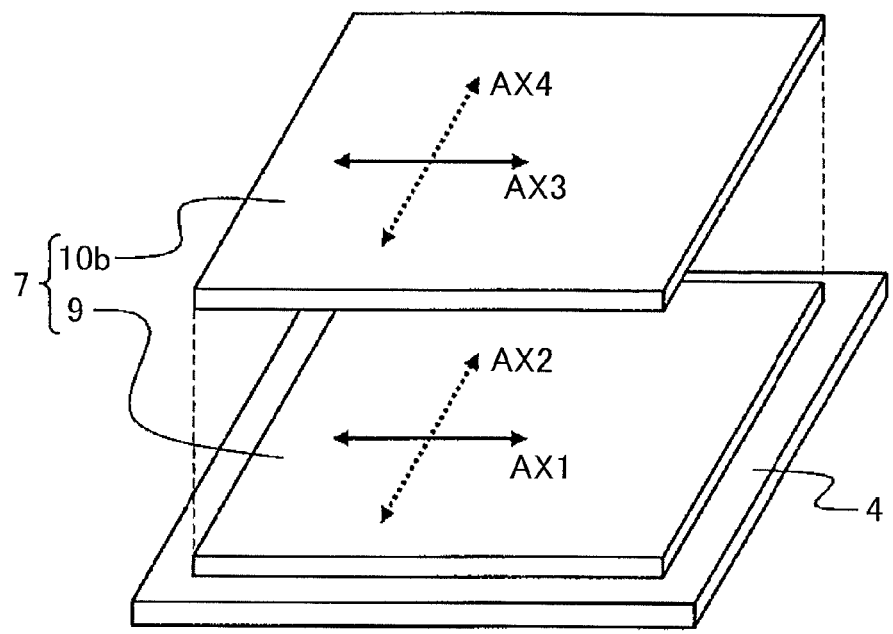
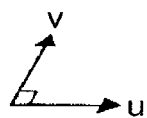
FIG.15
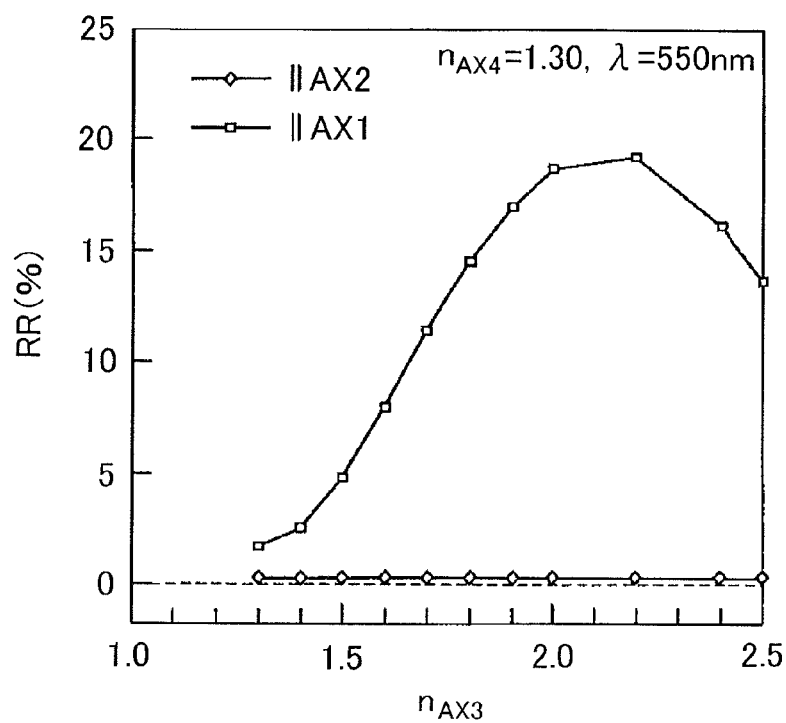

DISPLAY DEVICE AND THIN FILM POLARIZER USED FOR DISPLAY DEVICE

CROSS-REFERENCE TO RELATED APPLICATION

This application is a continuation of U.S. application Ser. No. 13/022,774, filed Feb. 8, 2011, the contents of which are incorporated herein by reference.

The present application claims priority from Japanese application JP 2010-025444 filed on Feb. 8, 2010, the content of which is hereby incorporated by reference into this application.

BACKGROUND OF THE INVENTION

1. Field of the Invention

The present invention relates to a display device and a thin film polarizer used for the display device.

2. Description of the Related Art

A display device is a device which visually transmits information to a viewer. In this day and age of sophisticated information society, the existence of the display device is crucial for men and society. Particularly, the performance of a liquid crystal display (LCD) has been remarkably enhanced recently and has been adopted as a display device of a mobile phone, a personal computer, a large-screen television receiver set or the like.

As one example of the display device, there have been known liquid crystal displays. With respect to most of liquid crystal displays, the liquid crystal display includes a liquid crystal display panel in which a liquid crystal layer is provided between a pair of substrates and a backlight unit. By modulating an area beam from the backlight unit by the liquid crystal display panel, the liquid crystal display visually transmits information such as a video or an image to a viewer. The liquid crystal display panel of the liquid crystal display having such a backlight unit has a pair of thin film polarizers which is arranged with a liquid crystal layer sandwiched therebetween. In the conventional liquid crystal display panel, it is often the case that the thin film polarizer is formed of a film-like polarizer (hereinafter referred to as a film polarizer), and the film polarizers are arranged with the pair of substrates and the liquid crystal layer sandwiched therebetween. The film polarizers are adhered to the substrates using an adhesive material (including a tacky adhesive material) respectively.

The film polarizer is configured such that, for example, a thin film polarizer which controls a transmission quantity of light is sandwiched by a pair of protection films. Further, it is necessary to adhere the film polarizer to the substrate using the adhesive material as described above. Accordingly, a method of manufacturing a liquid crystal display panel in which a film polarizer is adhered to a substrate requires a large number of steps so that the method is disadvantageous for the reduction of a manufacturing cost, for example.

Accordingly, recently, as a method of manufacturing a liquid crystal display panel, for example, there has been proposed a method in which a polarization element film (polarization element layer) is directly formed on surfaces of the substrates which sandwich a liquid crystal layer therebetween. A material which is used in the direct formation of the polarization element film on the surfaces of the substrates and a forming method are described in JP 2009-132748 A or the like, for example.

SUMMARY OF THE INVENTION

A refractive index of a film polarizer used in a liquid crystal display panel is approximately 1.5 and hence, the refractive index is substantially equal to a refractive index of a transparent glass substrate, a substrate made of polyethylene terephthalate (PET) resin or the like. Accordingly, a liquid crystal display panel where the film polarizer is adhered to the glass substrate exhibits small reflection of light on an interface between the film polarizer and the glass substrate.

However, as an in-plane refractive index of dye contained in a polarization element film used as a substitute for a film polarizer, a value within a range from 1.6 to 1.9 is used, for example. This in-plane refractive index of the polarization element film is larger than a refractive index (1.5) of the film polarizer. Further, since a refractive index of air is approximately 1.0, the difference in refractive index between the polarization element film and air is larger than the difference in refractive index between the film polarizer and air. Therefore, the reflection of light on the interface between the polarization element film and air is larger than the reflection of light on the interface between the film polarizer and air. Accordingly, for example, in a liquid crystal display panel in which a polarization element film is directly formed on a surface of a substrate, the lowering of transmittance and a dichroic ratio of the polarization element film becomes large. As a result, contrast of a liquid crystal display is lowered thus giving rise to a drawback that visibility is lowered.

Further, light which is incident on the polarization element film repeats reflection and transmission thus causing interference on an interface between the glass substrate and the polarization element film and on an interface between the polarization element film and an air layer. Since the refractive index of the polarization element film differs in plane, the light interference condition differs between the absorption axis direction and the direction orthogonal to the absorption axis direction (transmission axis direction) in the polarization element film. Accordingly, when a film thickness of the polarization element film is changed, the interference condition of light differs between the absorption axis direction and the transmission axis direction so that the transmittance of the thin film polarizer is changed respectively. That is, the change of the film thickness of the polarization element film may bring about a drawback that contrast is changed. Further, the polarization element film exhibits the different absorptions depending on a dye element and hence, in forming the polarization element film, it is preferable to select a film thickness which allows the acquisition of required transmittance and contrast. However, it may be difficult to set a film thickness of the polarization element film to a required film thickness while conforming to the interference condition of light in the absorption axis direction and the transmission axis direction. In view of the above, for conforming to the interference condition, it may be preferable to form a background layer which is interposed between the polarization element film and the glass substrate.

Further, in directly forming the polarization element film on the surface of the substrate, the polarization element film is formed by applying a material in a solution state to the substrate and, thereafter, by drying the material. Here, dye molecules are laminated by a $\pi$ electron interaction in the polarization element film so that structural bodies of laminated dye are formed. However, in the film having the structural bodies which are formed in this manner, a bonding force between the film and the substrate and mutual a bonding force between the structural bodies are weak and hence, the polarization element film exhibits poor physical strength. Accordingly, when the polarization element film is used as a substitute for a film polarizer, it is necessary to increase the physical strength by forming a protection layer on the polarization element film.

An anisotropic compound such as an organic dye or the like which is usually used in the polarization element film is usually soluble in water which is preferably used as a solvent at the time of forming the polarization element film. Accordingly, when a material which is soluble in water is used as a solvent at the time of forming a protection layer, for example, there arises a drawback that the solvent intrudes into the polarization element film and disturbs the orientation of dyes. The disturbance of the orientation in the polarization element film leads to lowering of transmittance and a dichroic ratio whereby contrast of a liquid crystal display is lowered and the visibility is also lowered eventually. What has discussed above is also applicable to a display device where a quarter-wave plate is formed on a substrate and a polarization element film is formed on the quarter-wave plate, for example.

It is an object of the present invention to provide a technique which can enhance transmittance and contrast of a display device.

The above-mentioned and other objects and novel technical features of the present invention will become apparent from the description of the specification and attached drawings.

To schematically explain the typical inventions among the inventions disclosed in this specification, they are as follows.

(1) According to one aspect of the present invention, there is provided a display device which includes: a first substrate; a second substrate; and a thin film polarizer which is directly formed on a surface of the second substrate on a side opposite to a side where the first substrate is arranged, the thin film polarizer including a polarization element film and a protection layer which is laminated to the polarization element film as viewed from the substrate, wherein the polarization element film is made of an aligned lyotropic liquid crystal, and the protection layer is made of a material having a refractive index smaller than a refractive index of the polarization element film in a transmission axis direction, and has a thickness smaller than a thickness of the polarization element film.

(2) As one mode of the display device having the above-mentioned constitution (1), the thin film polarizer has a background layer which is interposed between the polarization element film and the substrate, and the background layer has orientation, and an alignment direction of the background layer is approximately parallel to an alignment direction of the lyotropic liquid crystal.

(3) According to another aspect of the present invention, there is provided a display device which includes: a first substrate; a second substrate; and a thin film polarizer which is directly formed on a surface of the second substrate on a side opposite to a side where the first substrate is arranged, the thin film polarizer including a polarization element film and a protection layer which is laminated to the polarization element film as viewed from the substrate, wherein the polarization element film is made of an aligned lyotropic liquid crystal material, and the protection layer has a refractive index thereof in a first direction which is parallel to a transmission axis of the polarization element film set smaller than a refractive index of the polarization element film in the transmission axis direction, and has a refractive index thereof in a second direction which is parallel to an absorption axis direction of the polarization element film set larger than the refractive index thereof in the first direction.

According to the display device of the present invention, it is possible to enhance transmittance and contrast of the display device.

BRIEF DESCRIPTION OF THE DRAWINGS

FIG. 14 is a schematic exploded perspective view showing one example of the schematic constitution of a thin film polarizer according to an embodiment 3 of the present invention;

FIG. 15 is a graph showing the relationship between a refractive index and relative reflectance of an anisotropic layer in the phase delay axis direction;

DETAILED DESCRIPTION OF THE INVENTION

Hereinafter, embodiments of the present invention are explained in detail in conjunction with drawings.

Here, in all drawings for explaining the embodiments, parts having identical functions are given same symbols and the repeated explanation of these parts is omitted.

Figure 1:
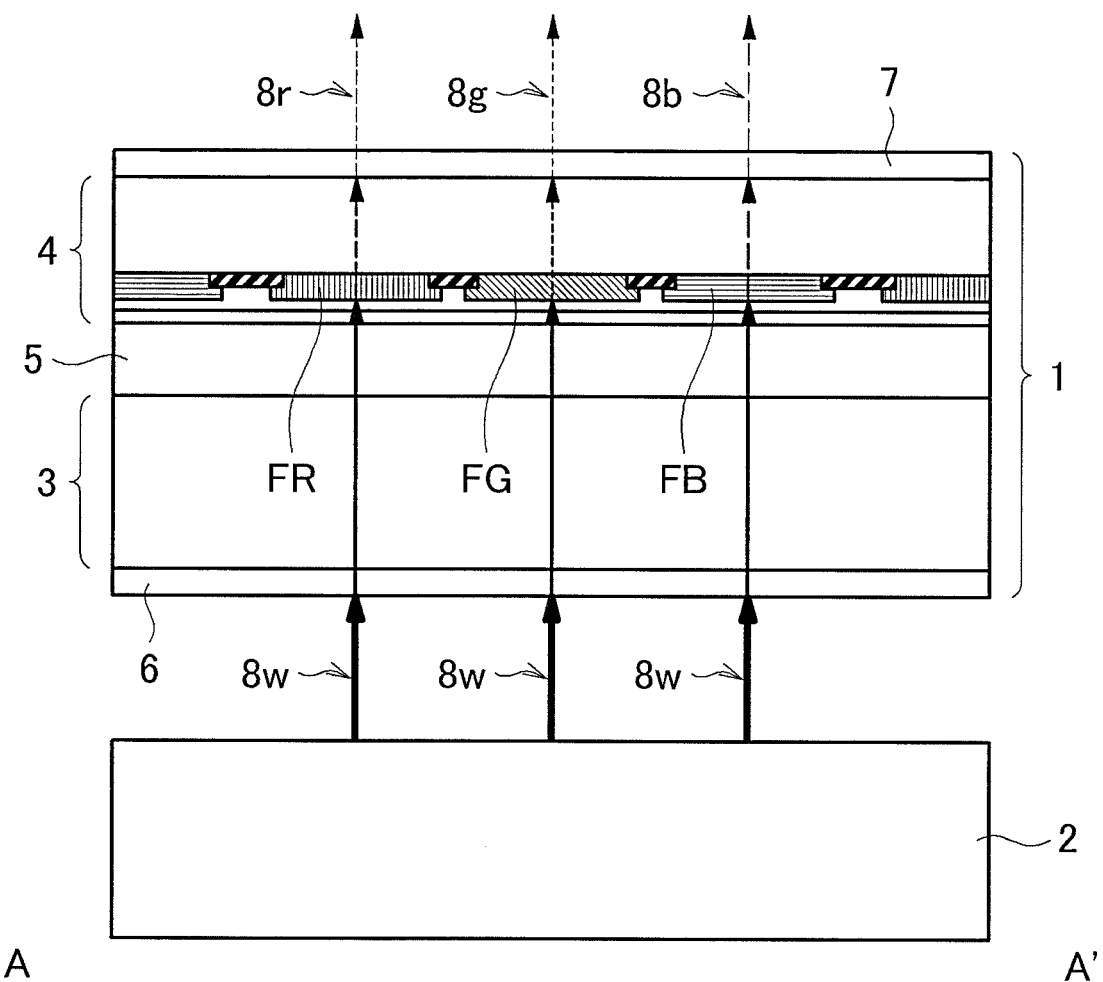
FIG. 1 is a schematic cross-sectional view showing one example of the cross-sectional constitution of an essential part of a liquid crystal display.
Figure 2:
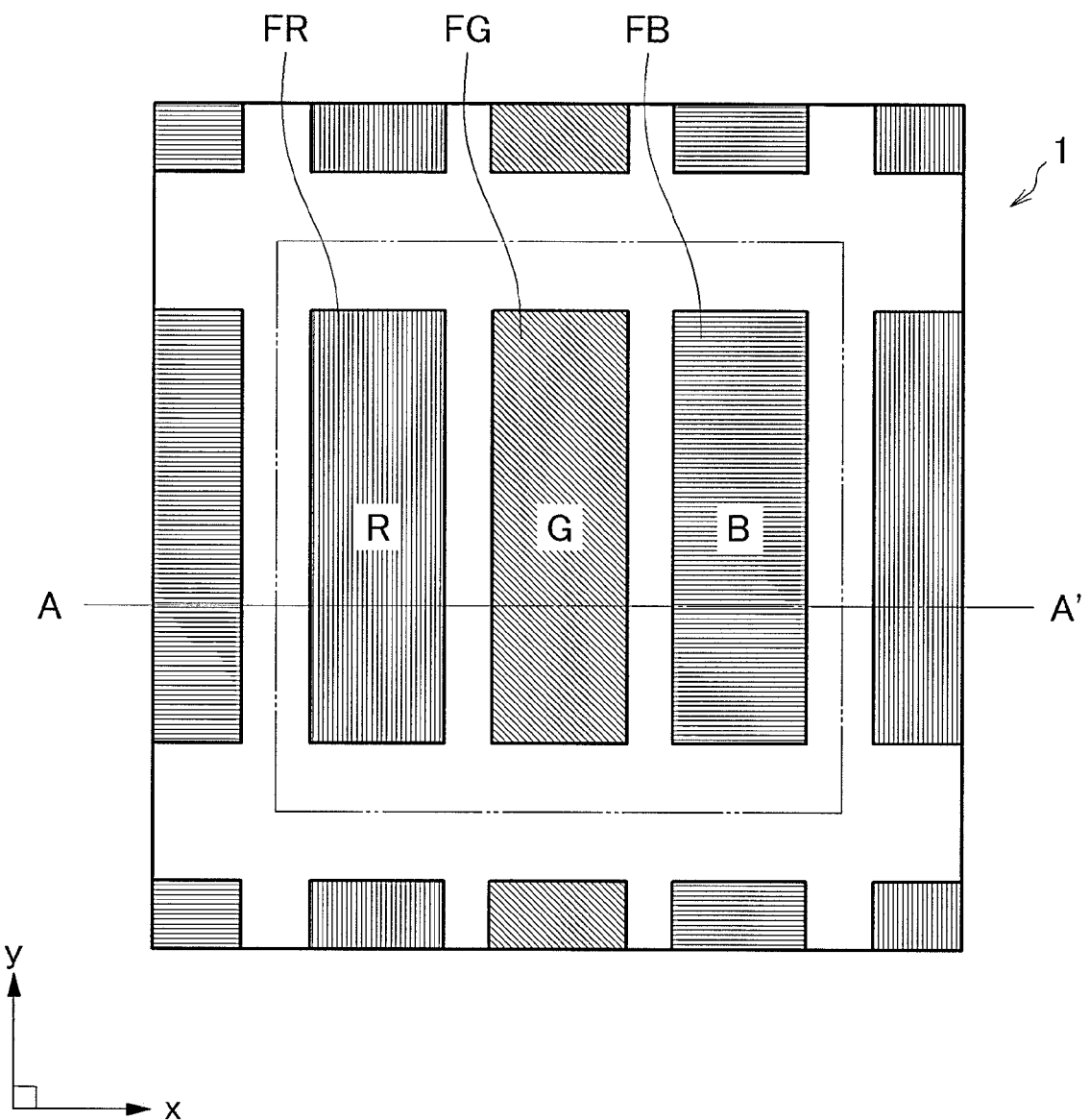
FIG. 2 is a schematic plan view showing one example of the planar constitution of a pixel of a liquid crystal display panel.

FIG. 1 and FIG. 2 are schematic views for explaining one example of the schematic constitution of an essential part of a liquid crystal display according to the present invention.

FIG. 1 is a schematic cross-sectional view showing one example of the cross-sectional constitution of the essential part of the liquid crystal display. FIG. 2 is a schematic plan view showing one example of the planar constitution of a pixel of a liquid crystal display panel.

Here, a cross section of the liquid crystal display panel 1 shown in FIG. 1 corresponds to a cross section taken along a line A-A' in FIG. 2.

As shown in FIG. 1, for example, the liquid crystal display of the present invention includes the liquid crystal display panel 1 and a backlight unit 2.

The liquid crystal display panel 1 includes a first substrate 3, a second substrate 4, a liquid crystal layer 5, a first thin film polarizer 6, and a second thin film polarizer 7.

The first substrate 3 is a substrate referred to as a TFT substrate, and the second substrate 4 is a substrate referred to as a counter substrate or a color filter substrate. The constitution of the first substrate 3 and the second substrate 4 is well known, and various constitutions are known as the constitution of the first and second substrates 3, 4. Further, the combination of the constitution of the first and second substrates 3, 4 and a liquid crystal material used as the light crystal layer 5 is also well known, and various combinations are known as such combination. Further, the present invention relates to at least one of the first thin film polarizer 6 and the second thin film polarizer 7 so that, in the present invention, the constitution of the first substrate 3 and the second substrate 4, the liquid crystal material used as the liquid crystal layer 5 and the like may be changed when appropriate. Accordingly, in this specification, the detailed explanation of the constitution of the first substrate 3 and the second substrate 4 and the liquid crystal material used as the liquid crystal layer 5 is omitted.

The first thin film polarizer 6 and the second thin film polarizer 7 shown in FIG. 1 are layers having the same function as film polarizers used in a liquid crystal display panel of the related art. Further, the first thin film polarizer 6 and the second thin film polarizer 7 of the liquid crystal display shown in FIG. 1 are directly formed on a surface of the first substrate 3 and a surface of the second substrate 4 respectively. Here, the first thin film polarizer 6 is arranged on the first substrate 3 on a side opposite to a side where the second substrate 4 is arranged. Further, the second thin film polarizer 7 is arranged on the second substrate 4 on a side opposite to a side where the first substrate 3 is arranged. The explanation of the first thin film polarizer 6 and the second thin film polarizer 7 is made later. In this specification, the thin film polarizer which is directly formed on a surface of a substrate does not mean a layer which is formed by adhering a polarization member such as a film polarizer prepared in advance to a substrate using an adhesive material, but means a layer structure which is formed on a surface of a substrate and includes a layer having a polarization property which is formed by applying a predetermined material.

The backlight unit 2 is an illuminating device which converts light emitted from a light source such as a fluorescent tube or a light emitting diode into an area beam and allows the area beam to be incident on the liquid crystal display panel 1. The constitution of the backlight unit 2 in the liquid crystal display shown in FIG. 1 can be changed when appropriate. Accordingly, in this specification, the detailed explanation of the constitution of the backlight unit 2 is omitted.

In the liquid crystal display shown in FIG. 1, by modulating an area beam irradiated from the backlight unit 2 by the liquid crystal display panel 1, it is possible to visually transmit information such as a video or an image to viewers (men).

Here, light 8w which is irradiated from the backlight unit 2 toward the liquid crystal display panel 1 is firstly incident on the first thin film polarizer 6. Light 8w is usually white light, and is light which is mainly constituted of linear polarized light parallel to a certain direction, for example. Accordingly, by arranging the absorption axis direction of the first thin film polarizer 6 substantially orthogonal to the polarization direction of the light 8w, most of the light 8w passes through the first thin film polarizer 6, passes through the first substrate 3 and the liquid crystal layer 5, and is incident on color filters which are formed on the second substrate 4. On the second substrate 4, as the color filters, for example, a red filter FR through which only reddish light 8r passes, a green filter FG through which only greenish light 8g passes, and a blue filter FB through which only bluish light 8b passes are formed.

The reddish light 8r, the greenish light 8g, and the bluish light 8b which pass through the color filters formed on the second substrate 4 are incident on the second thin film polarizer 7. The polarization states of the lights 8r, 8g, 8b which are incident on the second thin film polarizer 7 are respectively changed corresponding to an alignment state of the liquid crystal layer 4 through which the lights 8r, 8g, 8b pass. Further, the transmission quantities of the lights 8r, 8g, 8b which are incident on the second thin film polarizer 7 are changed corresponding to the relationship between the polarization states of these lights and absorption axis direction of the second thin film polarizer 7.

When the first thin film polarizer 6 is directly formed on the first substrate 3 and the second thin film polarizer 7 is directly formed on the second substrate 4, usually, to increase physical strength of these thin film polarizers, a protection film is formed on the polarization element films respectively. However, in directly forming the polarization element film and the protection layer on the first substrate 3 and the second substrate 4 respectively, in a conventional forming method, as described previously, the characteristics (transmittance and dichroic ratio) of the polarization element film are lowered so that contrast is lowered thus giving rise to drawbacks including a drawback that visibility of a liquid crystal display is lowered.

The present invention aims at overcoming such drawbacks, and, by providing the constitution explained hereinafter to the protection layer, suppresses lowering of the transmittance and dichroic ratio of the first thin film polarizer 6 and the second thin film polarizer 7 thus enhancing contrast of the liquid crystal display.

Embodiment 1

Figure 3:
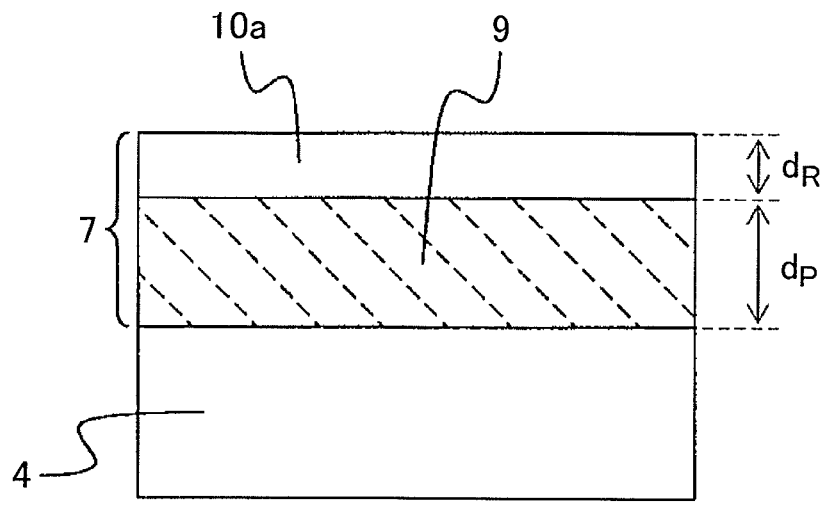
FIG. 3 is a schematic cross-sectional view showing one example of the cross-sectional constitution of a thin film polarizer according to an embodiment 1 of the present invention.

FIG. 3 is a schematic cross-sectional view showing one example of the cross-sectional constitution of thin film polarizers of the embodiment 1 according to the present invention.

In the embodiment 1, the explanation is made by focusing on the second thin film polarizer 7, that is, the thin film polarizer remoter from the backlight unit 2 out of the first thin film polarizer 6 and the second thin film polarizer 7 provided to the liquid crystal display panel 1 shown in FIG. 1. The second thin film polarizer 7 is directed toward a viewer's side and an external light is incident on the second thin film polarizer 7. Here, when the reflectance of the external light on the second thin film polarizer 7 is high, the visibility of the liquid crystal display is lowered by being influenced by the reflected external light. Accordingly, for example, as shown in FIG. 3, it is desirable to form the second thin film polarizer 7 such that a protection film (reflection preventing layer) 10a having a function of suppressing the reflection of the external light is formed on the polarization element film 9 as viewed from the second substrate 4. Hereinafter, the reflection preventing layer 10a having the function of suppressing the reflection of the external light is referred to as a reflection preventing layer.

The second substrate 4 is, as described previously, a substrate referred to as a counter substrate. A second thin film laminated body having color filters and the like is formed on a surface which faces the liquid crystal layer 5 in an opposed manner out of surfaces of a transparent substrate such as a glass substrate. Here, a polarization element film 9 is directly formed on a surface on a side opposite to the liquid crystal layer 5 out of the surfaces of the substrate. The polarization element film 9 is formed by a following method, for example.

Firstly, pretreatment is applied to the surface of the substrate. This pretreatment is treatment which is performed for enabling the uniform coating of the polarization element film 9. That is, cleaning of the surface of the substrate and the treatment for enhancing the wettability of the surface of the substrate are performed.

Cleaning of the surface of the substrate uses a solvent, a cleaning agent or the like which can favorably dissolve or remove smears adhered to the substrate. However, when the substrate is made of a resin (for example, acrylic, polycarbonate), it is more desirable to use an alcoholic solvent such as methanol, ethanol, propanol, butanol than a solvent which generates frosting due to dissolving of the surface (for example, tetrahydrofuran, dioxane or the like). Further, when the substrate is made of glass, by thinly etching a surface of the substrate by immersing the substrate in a base solution (for example, sodium hydrate aqueous solution or the like), smear can be also removed. Further, it is desirable to perform heating in parallel to the immersion of the substrate since the etching progresses speedily. However, when heating is performed for a long time, etching excessively progresses and frosting occurs on a surface of the substrate. Accordingly, it is necessary to pay attentions on heating.

Treatment for enhancing wettability of the surface of the substrate is performed for decreasing the irregularities in film thickness by uniformly applying paint to the substrate and for obtaining a favorable optical characteristic. As a method of enhancing the wettability of the surface of the substrate, for example, a surface modification method which uses a device such as a plasma irradiation device or the like, and a method which chemically modifies the surface of the substrate using an acid solution, a base solution or the like are named.

As the surface modification method which uses a device, for example, a method in which oxygen plasma is radiated to a surface of a substrate, a method in which a substrate is held in an ozone atmosphere, a method in which ultraviolet rays are radiated to a surface of a substrate or the like can be named. In all of these methods, active oxygen reacts with the surface of the substrate so that a hydroxyl group, a carboxyl group and the like are produced. These groups are hydrophilic so that the wettability of the surface on which these groups are produced is enhanced. Accordingly, a film having a uniform thickness can be easily formed by coating. Here, the UV radiation is a method which brings oxygen in air into an activated state using ultraviolet rays and the activated oxygen modifies the surface of the substrate and hence, the UV radiation can acquire advantageous effects substantially equal to advantageous effects acquired by the oxygen plasma radiation or holding of the substrate in an ozone atmosphere. As a method other than the above-mentioned methods, for example, a method in which argon plasma is radiated to a surface of a substrate or the like can be named. Although the argon plasma radiation can also enhance wettability of the surface, when an output of a high frequency power source of a plasma generation device is equal, it is necessary to set a time for radiating argon plasma longer than a time for radiating oxygen plasma.

Further, as a method in which the surface is chemically modified, for example, a method in which a glass substrate is immersed into a sodium hydroxide aqueous solution is named. When the glass substrate is immersed into the sodium hydroxide aqueous solution, silicon-oxygen bonding on a surface of the glass substrate is cut so that a hydroxyl group is generated whereby wettability of the surface of the glass substrate is enhanced. In the same manner, when an acrylic plate is immersed into a base, the wettability of the acrylic plate is also enhanced. To explain this principle, an ester group on a surface of the acrylic plate is hydrolyzed so that a hydroxyl group or a carboxyl group is exposed whereby hydrophilicity of the surface of the plate is enhanced.

When the above-mentioned pretreatment is finished, next, the polarization element film 9 is formed on the surface of the substrate. A material used for forming the polarization element film 9 (hereinafter, referred to as a polarization element material) is a kind of lyotropic liquid crystal, and is usually soluble in water which is preferably used as a solvent. Further, such a polarization element material can use an organic dye which has absorption in a visible light wavelength region, and the lyotropic liquid crystal is made of any one of an azo-series dye, an anthraquinone-series dye, perylene-series dye, an indanthrone-series dye, an imidazole-series dye or a mixture of the dyes. As a specific example of the organic dye having absorption in the visible light wavelength region, C. I. Direct Yellow 12, C. I. Direct Yellow 34, C. I. Direct Yellow 86, C. I. Direct Yellow 142, C. I. Direct Yellow 132, C. I. Acid Yellow 25, C. I. Direct Orange 39, C. I. Direct Orange 72, C. I. Direct Orange 79, C. I. Acid Orange 28, C. I. Direct Red 39, C. I. Direct Red 79, C. I. Direct Red 81, C. I. Direct Red 83, C. I. Direct Red 89, C. I. Acid Red 37, C. I. Direct Violet 9, C. I. Direct Violet 35, C. I. Direct Violet 48, C. I. Direct Violet 57, C. I. Direct Blue 1, C. I. Direct Blue 67, C. I. Direct Blue 83, C. I. Direct Blue 90, C. I. Direct Green 42, C. I. Direct Green 51, C. I. Direct Green 59 or the like can be named.

Here, the polarization element material may contain, out of these organic dyes, one kind of organic dye singly or may contain two or more kinds of organic dyes at an arbitrary ratio and in arbitrary combination.

To form the polarization element film 9, for example, a slit dye coater, a bar coater, an applicator or the like may preferably be used. It is particularly desirable to use the slit dye coater. When the slit dye coater is used, a distance between the substrate and a distal end portion of a slit is several tens μm and hence, a surface of the polarization element film 9 is hardly scratched. Further, the slit dye coater can, while supplying a polarization element material in a solution state to a coating surface, stretch the polarization element material in the coating direction by applying a pressure to the polarization element material. Accordingly, dye is aligned at a stage where the polarization element material is applied to the substrate by coating and, thereafter, the polarization element film 9 is formed by drying the coated polarization element material. In this case, a transmission axis of the polarization element film 9 becomes the coating direction, and an absorption axis of the polarization element film 9 becomes the direction orthogonal to the coating direction.

After forming the polarization element film 9 in accordance with the above-mentioned steps, next, the reflection preventing layer 10a is formed on the polarization element film 9. The reflection preventing layer 10a is formed in the same manner as the polarization element film 9 such that a coating material in a solution state is applied to the polarization element film 9 by coating and, thereafter, the coating material is dried. The coating material used for forming the reflection preventing layer 10a is contained of a binder, inorganic fine particles, and a solvent.

As a binder used for forming the reflection preventing layer 10a, for example, a highly transparent organic or inorganic polymer molecule material, or a highly transparent material which can be polymerized is named. In forming the reflection preventing layer 10a using a coating material, depending on a solvent to be used, there may be a case where the polarization element film 9 is melted so that the orientation of dye is disturbed. Accordingly, it is preferable to use ketones having no water or no hydroxyl group as the solvent. As the binder which is dissolved in such a solvent, for example, a thermoplastic polymer molecule material is named. To be more specific, an acrylic resin, a polycarbonate resin or the like can be named. This binder is also used, for example, in the formation of a protection layer which is formed on an anisotropic layer made of an organic dye which is soluble in water in the same manner.

Further, as the inorganic fine particles used for forming the reflection preventing layer 10a, for example, colorless or white fine particles made of magnesium fluoride, oxide silicon, aluminum oxide, titanium oxide or the like can be named. With respect to a size of the fine particles, from a viewpoint of the enhancement of the flatness of the film, it is desirable to set the size in a short axis of the particles equal to or less than an average film thickness. Further, among the above-mentioned fine particles, from a viewpoint that a film having a low refractive index can be easily obtained, magnesium fluoride (refractive index being approximately 1.38), oxide silicon (refractive index being approximately 1.5 to 1.7), aluminum oxide (refractive index being approximately 1.7 to 1.9) or the like which has a relatively low refractive index is preferably used. Particularly, magnesium fluoride is a material having a lower refractive index than oxide silicon and aluminum oxide and hence, by dispersing the magnesium fluoride in a binder, it is possible to form a film having large physical strength even when a rate of pores in the binder is relatively small. Accordingly, it is preferable to use magnesium fluoride as inorganic fine particles. As magnesium fluoride, CIK NanoTek Corporation MFMIBK15 WT %-P26 (magnesium fluoride (weight 15 WT %), solvent: methyl isobutyl ketone (weight 85 WT %)) made by CIK NanoTek Corporation is named, for example.

Still further, it is preferable to set an average particle size of the fine particles made of magnesium fluoride to 190 nm or less for preventing a visible light (wavelength of 380 nm to 760 nm) incident on the formed reflection preventing layer 10a from scattering. When the particle size exceeds 190 nm, light which is incident on the reflection preventing layer 10a scatters and hence, the film becomes turbid thus giving rise to a drawback that the reflection preventing layer 10a may not be preferably applicable to a display and fields relating to the display.

Further, as a solvent which is used in forming the reflection preventing layer 10a, a solvent which can dissolve the binder or can uniformly disperse the binder is effectively used. Further, when the solvent containing water or a hydroxyl group is soaked into the polarization element film 9, the solvent intrudes into the polarization element film 9 thus deteriorating the orientation of a dye. In this manner, when the solvent containing water or a hydroxyl group is selected, the characteristic of the polarization element film 9 is remarkably deteriorated.

In the case of the coating material which contains the above-mentioned polycarbonate resin as the preferred binder and the above-mentioned magnesium fluoride fine particles as the preferred inorganic fine particles, it is preferable to use a ketone solvent or an ether solvent as the solvent. To be more specific, methyl isobutyl ketone, cyclohexanone or the like is named.

In forming the reflection preventing layer 10a using the above-mentioned coating material containing the binder, the inorganic fine particles and the solvent, the coating material is applied to the polarization element film 9 by coating and, thereafter, the coating material is heated thus forming the reflection preventing layer 10a. Here, for example, the post-treatment for enhancing the abrasion resistance of the reflection preventing layer 10a may be performed after heating.

As a method of applying the coating material by coating, for example, spin coating, dip coating, bar coating, coating using an applicator, spray coating, flow coating and the like are named. However, the method is not particularly limited, and any coating method can be used provided that a coating film having a predetermined thickness can be uniformly formed by coating. That is, although the coating method per se can be arbitrarily selected, it is necessary to properly select the concentration of the coating material and conditions of the individual coating method for properly controlling a film thickness. For example, in the case of spin coating, a film thickness is influenced by a rotational speed and a rotation time. The film thickness is particularly largely influenced by the rotational speed and there exists a tendency that the higher the rotational speed, the smaller the film thickness becomes. In the case of dip coating, a film thickness is influenced by an immersion time and a pick-up speed. The film thickness is particularly largely influenced by the pick-up speed and there exists a tendency that the lower the pick-up speed, the smaller the film thickness becomes. In the case of bar coating, the setting of a proper number is a condition which is peculiar to such coating. In the case of coating using the applicator, the setting of a gap size is a condition which is peculiar to such coating. In the case of spray coating, a moving speed of a spray is a condition which is peculiar to such coating. In the case of flow coating, an angle at which a substrate is held and a quantity of paint to be used are conditions which are peculiar to such coating.

In applying a coating material by coating, it is desirable to set a target film thickness to 60 nm to 190 nm. Theoretically, assuming a film thickness as $d_R$, a wavelength of incident light as $\lambda$, a refractive index of a medium on which light is incident (transparent substrate and reflection preventing layer 10a of the present invention) as n, the reflectance becomes minimum when $d_R=\lambda/4n$ is satisfied.

Assuming that the incident light is in a visible light region (380 nm to 760 nm) and the use of the member is allowable within a range where the refractive index of a medium ranges from a refractive index of air (approximately 1.0) to a relatively high refractive index of a transparent glass substrate (approximately 1.7), the desirable minimum film thickness of the reflection preventing layer 10a is 380/(4×1.7)=56 nm. That is, to consider a case where the film thickness is less than 56 nm, when the light in the visible light range is incident, the reflection preventing layer 10a cannot sufficiently influence the reflectance. Accordingly, to take also the distribution of a film thickness when the film is formed by heating the coated film into consideration, it is desirable to target 60 nm which is slightly larger than 56 nm as the minimum film thickness. On the other hand, it is desirable to set the maximum film thickness to 190 nm in view of the calculation 760/(4×1.0)=190 nm. Due to the conditions described above, it is considered proper to set the film thickness $d_R$ of the reflection preventing layer 10a of the thin film polarizer of the embodiment 1 to 60 nm or more and 190 nm or less.

After applying the coating material, heating is performed for evaporating the solvent. By setting a heating temperature to a boiling point of the solvent or more, bubbles are produced in the coating film, pores are formed and remained in the coating film, and the residual solvent also remains in the coating film. And eventually, the refractive index of the film decreases as a result. In such heating, it is necessary to perform heating at a temperature equal to or below a heat resistance temperature of the polarization element film 9 (polarization element material). For example, when a polarization element material described in JP 2009-132748 A is used, a proper drying temperature for the polarization element film 9 is 120° C. or below. Further, when the polarization element material described in JP 2009-132748 A is used, methyl isobutyl ketone is preferably used as a solvent for a coating material for forming the reflection preventing layer 10a. A boiling point of methyl isobutyl ketone is approximately 116° C. Due to this combination, it is possible to suppress the degradation of the polarization element film 9 when the reflection preventing layer 10a is formed by vaporizing a solvent of the coating material. Further, it is needless to say that it is necessary to set the heating temperature to a temperature not only equal to or below the heat resistance temperature of the polarization element film 9 and a boiling point of the solvent but also equal to or below the heat resistance temperature of the substrate. Accordingly, in the manufacture of the liquid crystal display panel 1 having the thin film polarizer of the embodiment 1, it is necessary to select a solvent, a substrate and a binder such that these requirements are satisfied.

The reflection preventing layer 10a of the thin film polarizer of this embodiment 1 is formed by performing the above-mentioned heating. However, for example, it is possible to enhance antifouling property of a surface of the reflection preventing layer 10a by forming a layer made of a fluorine-containing compound having water repellant property on the surface of the reflection preventing film 10a. However, for preventing lowering of a reflection preventing effect of the reflection preventing layer 10a, it is necessary to set a thickness of the layer made of a fluorine-containing compound having water repellant property extremely small. Further, as a method of forming the layer made of a fluorine-containing compound having water repellant property, for example, a method of forming a coating film made of a fluorine-containing compound having water repellant property or the like may be named. However, when the reflection preventing layer 10a has low resistance, the surface resistance is increased by coating a surface of the reflection preventing layer 10a with a liquid-repellant fluorine-containing compound so that dirt such as dust is liable to be adhered to the surface of the reflection preventing layer 10a eventually.

As a material used for forming the layer (coating film) made of the fluorine-containing compound, for example, Cytop (made by ASAHI GLASS, CO., LTD.), INT304VC (made by INT Screen Co., Ltd.) or the like may be named. After diluting these materials with a solvent, the material is applied to the reflection preventing layer 10a and is heated so that the solvent is vaporized, and when necessary, the material is thermally cured thus forming a film. Accordingly, the liquid repellency of the surface of the reflection preventing layer 10a is enhanced so that antifouling property is enhanced.

When the polarization element film 9 and the reflection preventing layer 10a are directly formed on the surface of the substrate in accordance with the above-mentioned steps, it is found that it is appropriate to set the film thickness $d_R$ of the reflection preventing layer 10a to 60 nm to 190 nm as described previously. Next, a proper value of a film thickness $d_P$ of the polarization element film 9 is considered.

To find out a proper value of the film thickness $d_P$ of the polarization element film 9, inventors of the present invention form polarization element films 9 which differ in film thickness $d_P$ on a surface of a glass substrate, and the relationship between the film thickness $d_P$ of the polarization element film 9 and a contrast, and the relationship between the film thickness $d_P$ of the polarization element film 9 and transmittance are studied. The polarization element films 9 are formed in accordance with the following steps.

Firstly, as the pretreatment, ultraviolet rays emitted from a low-pressure mercury lamp are irradiated to a surface of the glass substrate having a longitudinal size of 100 mm, a lateral size of 100 mm, a thickness of 0.7 mm and a refractive index of 1.5. An irradiated light quantity is set to 10 mW and an irradiation time is set to 5 minutes. Due to such an operation, an angle of contact which the surface of the substrate to which ultraviolet rays are irradiated makes with water becomes 10 degrees or below. The angle of contact which the surface of the substrate makes with water before ultraviolet rays are irradiated becomes 30 to 35 degrees.

Next, the polarization element film 9 is formed on the surface of the glass substrate. The polarization element film 9 is formed such that a refractive index in the transmission axis direction becomes 1.6 and a refractive index in the absorption axis direction becomes 1.9.

Using the glass substrate having the polarization element film 9 which is formed in accordance with the above-mentioned steps, the relationship between the film thickness $d_P$ of the polarization element film 9 and a contrast (indicated by a broken line) and the relationship between the film thickness $d_P$ of the polarization element film 9 and transmittance (indicated by a solid line) are studied. A result shown in FIG. 4 is obtained.

Figure 4:
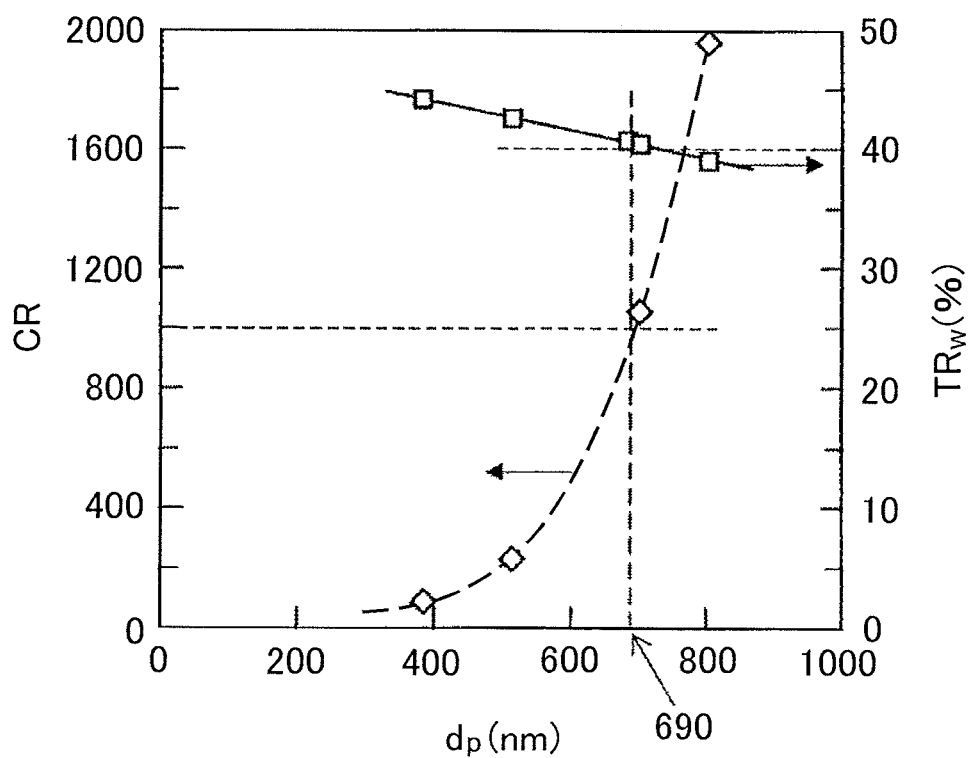
FIG. 4 is a graph for explaining a proper film thickness of a polarization element film of the thin film polarizer of the embodiment 1.

FIG. 4 is a graph for explaining a proper film thickness of the polarization element film of the thin film polarizer according to the embodiment 1.

In the graph shown in FIG. 4, a film thickness $d_P$ (μm) of the polarization element film 9 is taken on an axis of the abscissas, a contrast CR is taken on a left-side axis of ordinates, and white transmittance $TR_w$ (%) is taken on an a right-side axis of ordinates.

The contrast CR is expressed as a ratio between the white transmittance $TR_w$ and the black transmittance. The white transmittance $TR_w$ is transmittance when absorption axes of two polarization element films 9 are set parallel to each other, and the black transmittance is transmittance when the absorption axes of two polarization element films 9 are set orthogonal to each other.

As can be understood from FIG. 4, the trade-off relationship is established between the white transmittance $TR_w$ and the contrast CR with respect to the film thickness $d_P$ of the polarization element film 9. That is, when the film thickness $d_P$ of the polarization element film 9 is increased, the contrast CR is increased and the white transmittance $TR_w$ is lowered.

A contrast CR of a so-called middle-sized or miniaturized liquid crystal display panel (for example, a liquid crystal display panel used in a mobile electronic device such as a mobile phone terminal) is 200 to 1000. Further, some of light incident on the liquid crystal display panel 1 is absorbed or reflected by the first substrate 3, the second substrate 4 or the like, for example. Accordingly, it is necessary to set the contrast CR of the polarization element film 9 to 1000 or more. On the other hand, from a viewpoint of luminance, it is necessary to set the white transmittance $TR_w$ of the polarization element film 9 to at least 40% or more. To look at FIG. 4, the film thickness $d_P$ of the polarization element film 9 which satisfies these both conditions is approximately 690 nm. Accordingly, it is desirable to set the film thickness $d_P$ of the polarization element film 9 to 690 nm.

When the thin film polarizer is formed by laminating the polarization element film 9 and the reflection preventing layer 10a to each other as in the case of the embodiment 1, reflectance RR of the thin film polarizer is expressed by a following formula 1.

$$RR = \{(n_2^2 \times n_0 - n_s \times n_1^2)/(n_2^2 \times n_0 + n_s \times n_1^2)\}^2 \quad \text{(formula 1)}$$

In the formula 1, $n_0$ indicates a refractive index of air, $n_s$ indicates a refractive index of the substrate, $n_1$ indicates a refractive index of the reflection preventing layer 10a, $n_2$ indicates a refractive index of the polarization element film 9 which is arranged between the substrate and the reflection preventing layer 10a.

Here, assuming a case where the relationship among four refractive indexes used in the formula 1 satisfies the so-called non-reflection condition, that is, the relationship expressed by $(n_2/n_1)^2 = n_s/n_0$, the reflectance RR of the thin film polarizer becomes extremely small. When the refractive index $n_s$ of the glass substrate is 1.5 and a refractive index $n_2$ of the polarization element film 9 in the transmission axis direction is 1.6, the refractive index $n_1$ of the reflection preventing layer 10a which satisfies the non-reflection condition is approximately 1.3. Accordingly, by forming the reflection preventing layer 10a using a material whose refractive index becomes approximately 1.3, it is possible to make the reflection of an external light due to the thin film polarizer extremely small.

Here, it is desirable to set the film thickness $d_R$ of the reflection preventing layer 10a to ¼ $n_1$ of a wavelength 550 nm of light having high visual sensitivity, for example. This is because a phase of light which is reflected on an interface between the reflection preventing layer 10a and the polarization element film 9 is displaced from a phase of light which is reflected on an interface between the reflection preventing layer 10a and air by a ½ wavelength so that waves cancel each other eventually extinguishing a reflection light. ¼ $n_1$ of 550 nm is 107.3 nm, and this value falls within a proper range (60 nm to 190 nm) as the above-mentioned film thickness $d_R$ of the reflection preventing layer 10a.

In view of the above, when the relative reflectance is studied in a state where the polarization element film 9 having the film thickness $d_p$ of approximately 690 nm and the reflection preventing layer 10a having the film thickness $d_R$ of approximately 137.5 nm are laminated to the surface of the glass substrate and light is irradiated to the laminated body from a reflection preventing layer 10a side, a result shown in following Table 1 is obtained.

TABLE 1

|  | $RR_{REL}$ | |
| --- | --- | --- |
|  | ‖AX2 | ‖AX1 |
| COM1 | 1 | 1 |
| PRAC1 | 0.09 | 0.16 |

In Table 1, COM1 indicates a thin film polarizer of a comparison example 1 in which only a polarization element film having a film thickness $d_p$ of approximately 690 nm is formed on a surface of a glass substrate, and PRAC1 indicates the thin film polarizer of the embodiment 1, that is, the thin film polarizer in which the polarization element film 9 having a film thickness $d_p$ of approximately 690 nm and the reflection preventing layer 10a having a film thickness $d_R$ of approximately 107.3 nm are laminated to the surface of the glass substrate. $RR_{REL}$ indicates relative reflectance assuming reflectance of light on the thin film polarizer of the comparison example 1 as 1. Table 1 shows the reflectance of light having a wavelength of 550 nm. ‖AX2 indicates relative reflectance of light whose incident plane is parallel to the transmission axis direction of the polarization element film 9, and ‖AX1 indicates relative reflectance of light whose incident plane is parallel to the absorption axis direction of the polarization element film 9. Here, the incident plane is a plane surface which includes the incident direction of light incident on the thin film polarizer and the normal line direction of the thin film polarizer.

As a coating material used for forming the reflection preventing layer 10a, a polycarbonate resin is prepared as a binder, and a dispersion liquid of magnesium fluoride (CIK NanoTek Corporation: MFMIBK15 WT %-P26, methyl isobutyl ketone 85%) is prepared as inorganic fine particles. The coating material is applied on the polarization element film 9 by spin coating and thereafter, the coating material is heated thus preparing the reflection preventing layer 10a. Here, the coating material used for forming the reflection preventing layer 10a is prepared such that the refractive index of the reflection preventing layer 10a to be formed becomes 1.30.

As can be understood from Table 1, when the reflection preventing layer 10a is formed on the thin film polarizers, the relative reflectances of the thin film polarizers become approximately 0.09, 0.16 respectively. That is, in this case, the relative reflectances of the thin film polarizers can be largely suppressed compared to a case where the reflection preventing layer 10a is not formed on the thin film polarizers. Accordingly, it is confirmed that the thin film polarizers of the embodiment 1 have an effect of suppressing the reflection of an external light and this effect is extremely high.

Further, when the relative transmittances and dichroic ratios of these thin film polarizers in a state where light is irradiated to the thin film polarizers are studied, a following result shown in Table 2 is obtained.

TABLE 2

|  | $TR_{REL}$ | | |
| --- | --- | --- | --- |
|  | $TR_{‖}$ | $TR_{\perp}$ | $DR_{REL}$ |
| COM1 | 1 | 1 | 1 |
| PRAC1 | 1.04 | 1.10 | 1.32 |

Also in Table 2, COM1 indicates a thin film polarizer of a comparison example 1 in which only a polarization element film 9 having a film thickness $d_p$ of approximately 690 nm is formed on a surface of a glass substrate, and PRAC1 indicates the thin film polarizer of the embodiment 1, that is, the thin film polarizer in which the polarization element film 9 having a film thickness $d_p$ of approximately 690 nm and the reflection preventing layer 10a having a film thickness $d_R$ of approximately 107.3 nm are laminated to the surface of the glass substrate. $TR_{REL}$ indicates relative transmittance assuming transmittance of light through the thin film polarizer of the comparison example 1 as 1. Table 2 shows the transmittance of light having a wavelength of 550 nm. TR‖ indicates relative transmittance of light when a linear polarized light parallel to the transmission axis direction of the polarization element film 9 is incident on the thin film polarizer (hereinafter referred to as parallel transmittance), and $TR_{\perp}$ indicates relative transmittance of light when a linear polarized light parallel to the absorption axis direction of the polarization element film 9 is incident on the thin film polarizer (hereinafter referred to as orthogonal transmittance). Further, a dichroic ratio $DR_{REL}$ is a value expressed by a following formula 2.

$$DR=\log(TR_\perp)/\log(TR_\parallel) \quad \text{(Formula 2)}$$

As can be understood from Table 2, compared to the thin film polarizer of the comparison example 1, the thin film polarizer of the embodiment 1 has a parallel transmittance $TR_\parallel$ higher by approximately 4% and a dichroic ratio $DR_{REL}$ more improved by 32%. Accordingly, it is safe to say that the thin film polarizer of the embodiment 1 realizes the enhancement of the parallel transmittance $TR_\parallel$ and the effective dichroic ratio $DR_{REL}$.

In the above-mentioned explanation with respect to the thin film polarizer of the embodiment 1, only the thin film polarizer which is directly formed on the surface of the transparent substrate is considered. However, when the thin film polarizer of the embodiment 1 is applied to the liquid crystal display panel 1, the transmittance of light in the liquid crystal display panel 1 is not decided based on only the thin film polarizer but is influenced by various constitutional members which the liquid crystal display panel 1 includes. In view of the above, the transmittance of light when the thin film polarizer of the embodiment 1 is applied to the liquid crystal display panel 1 and the like are explained.

FIGS. 5 to 9 are schematic views for explaining one example of the schematic constitution of the liquid crystal display panel to which the thin film polarizer of the embodiment 1 is applied.

Figure 5:
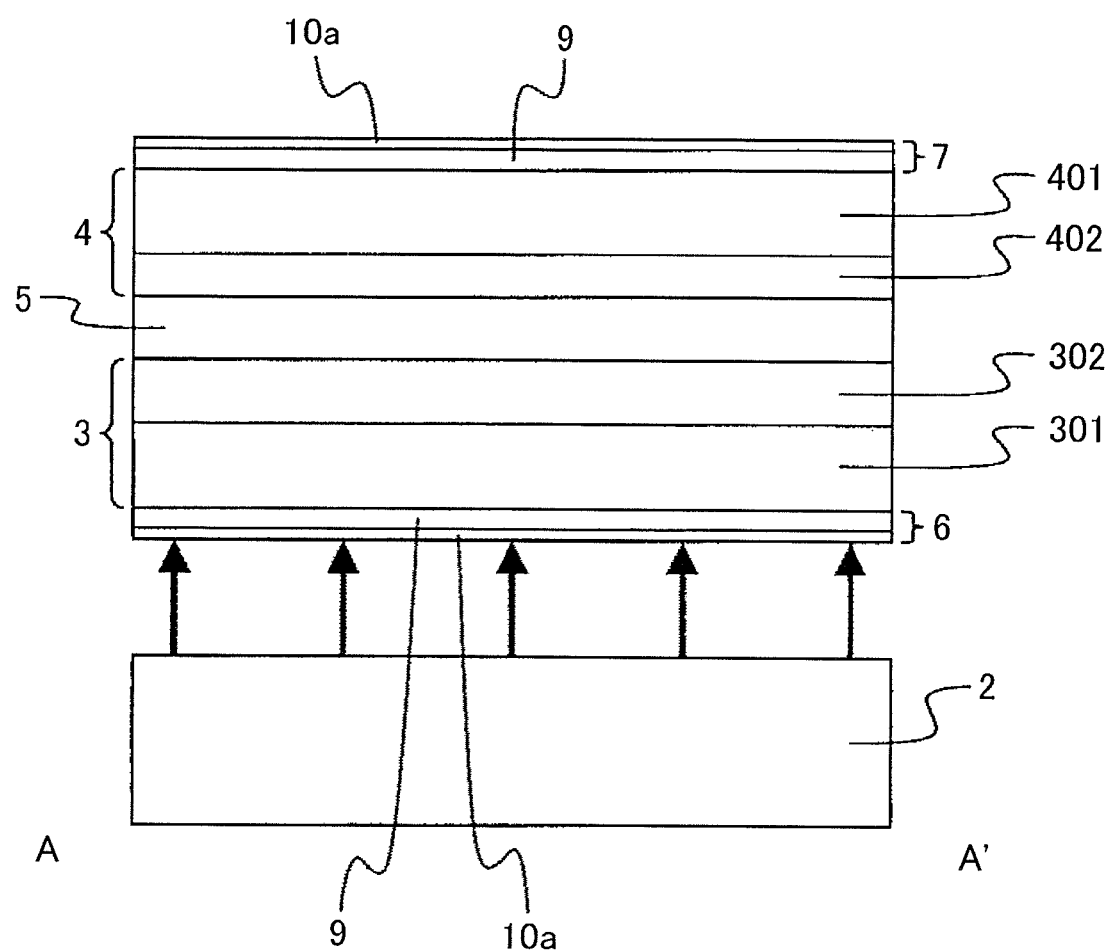
FIG. 5 is a schematic cross-sectional view showing one example of the cross-sectional constitution of the liquid crystal display panel to which the thin film polarizer of the embodiment 1 is applied.
Figure 6:
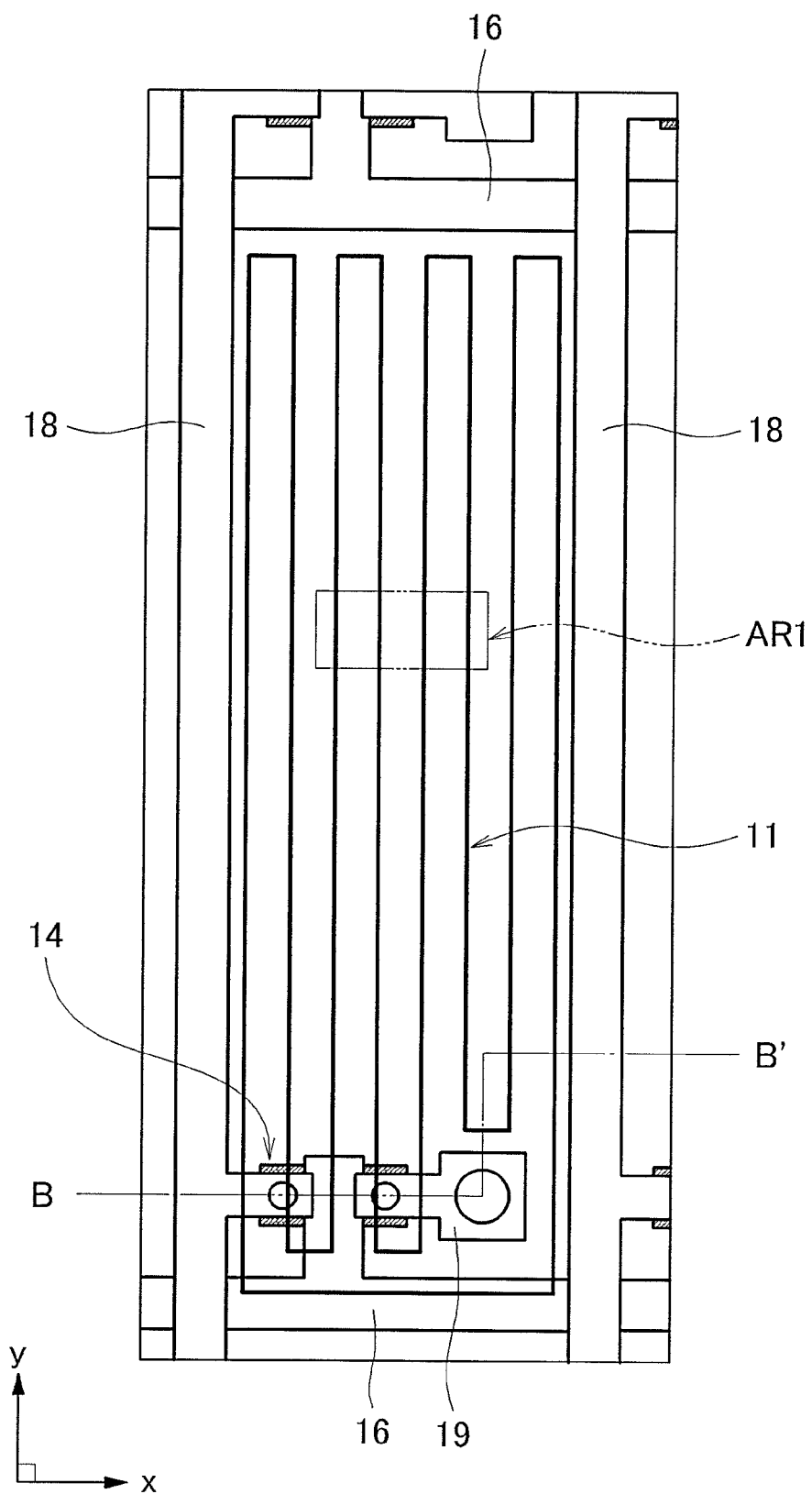
FIG. 6 is a schematic plan view showing one example of the planar constitution of a pixel on a first substrate.
Figure 7:
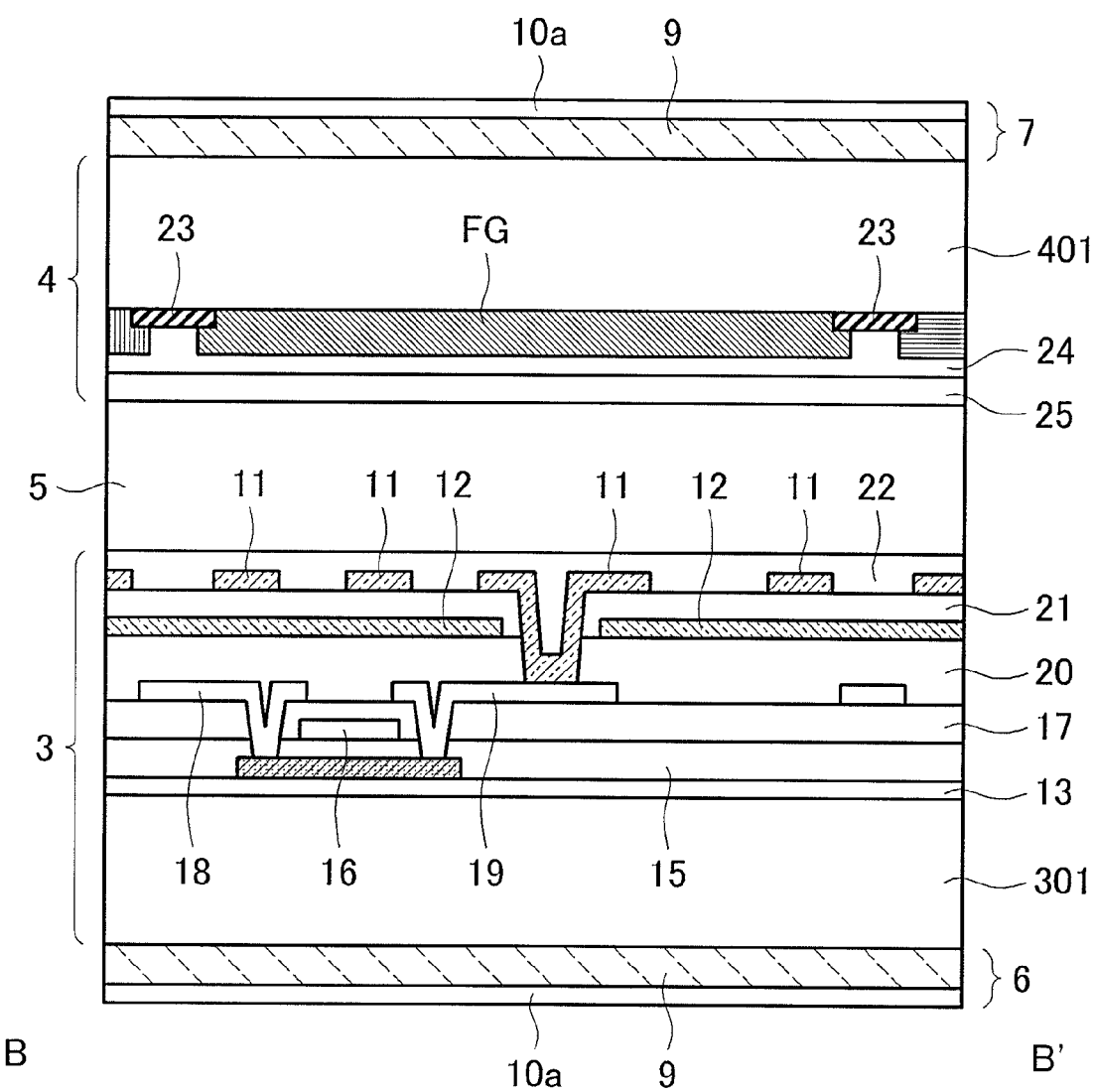
FIG. 7 is a schematic cross-sectional view showing one example of the cross-sectional constitution of the liquid crystal display panel taken along a line B-B' in FIG. 6.
Figure 8:
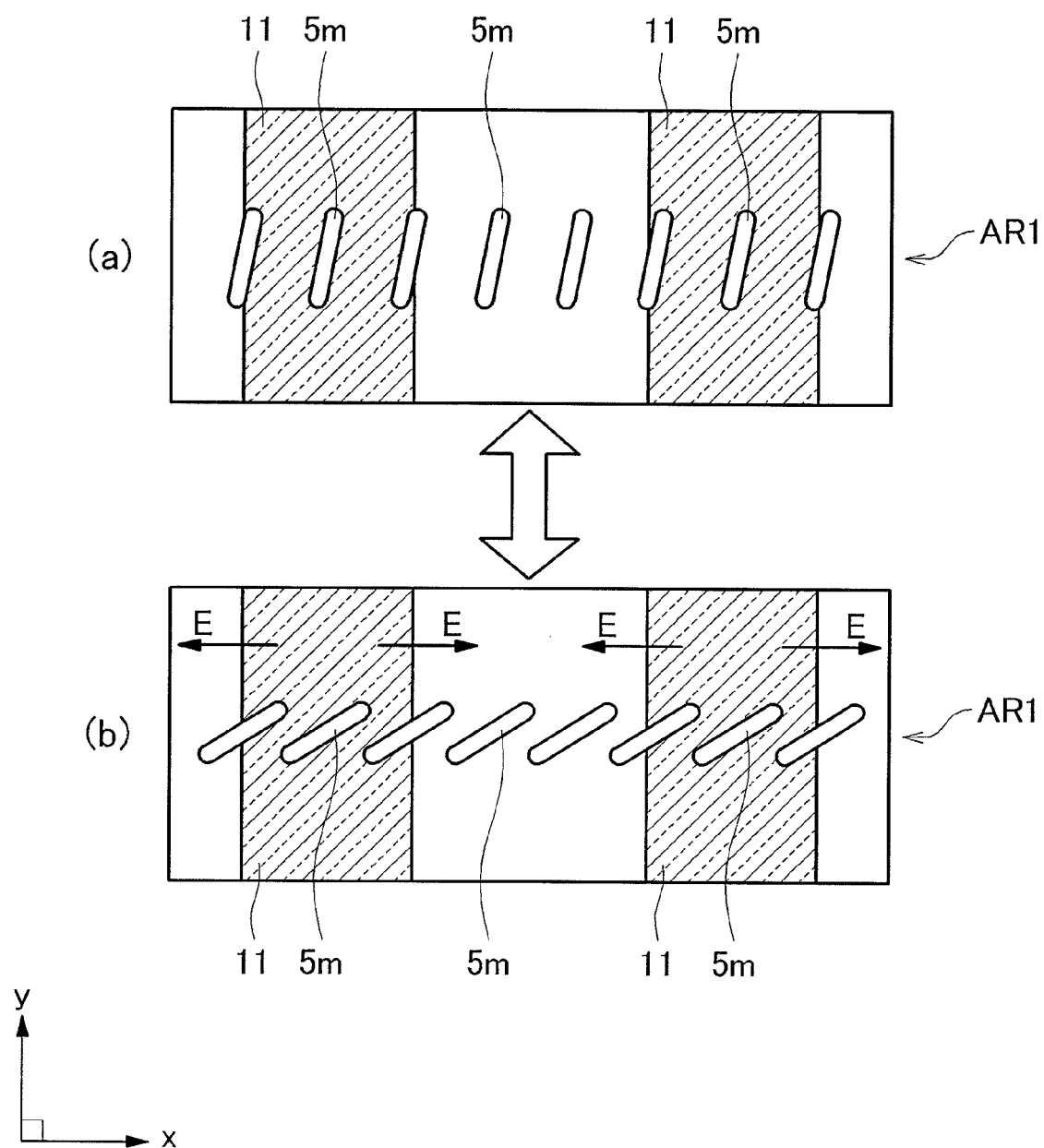
FIG. 8 is a schematic plan view for explaining the manner how the alignment of the liquid crystal layer is changed.
Figure 9:
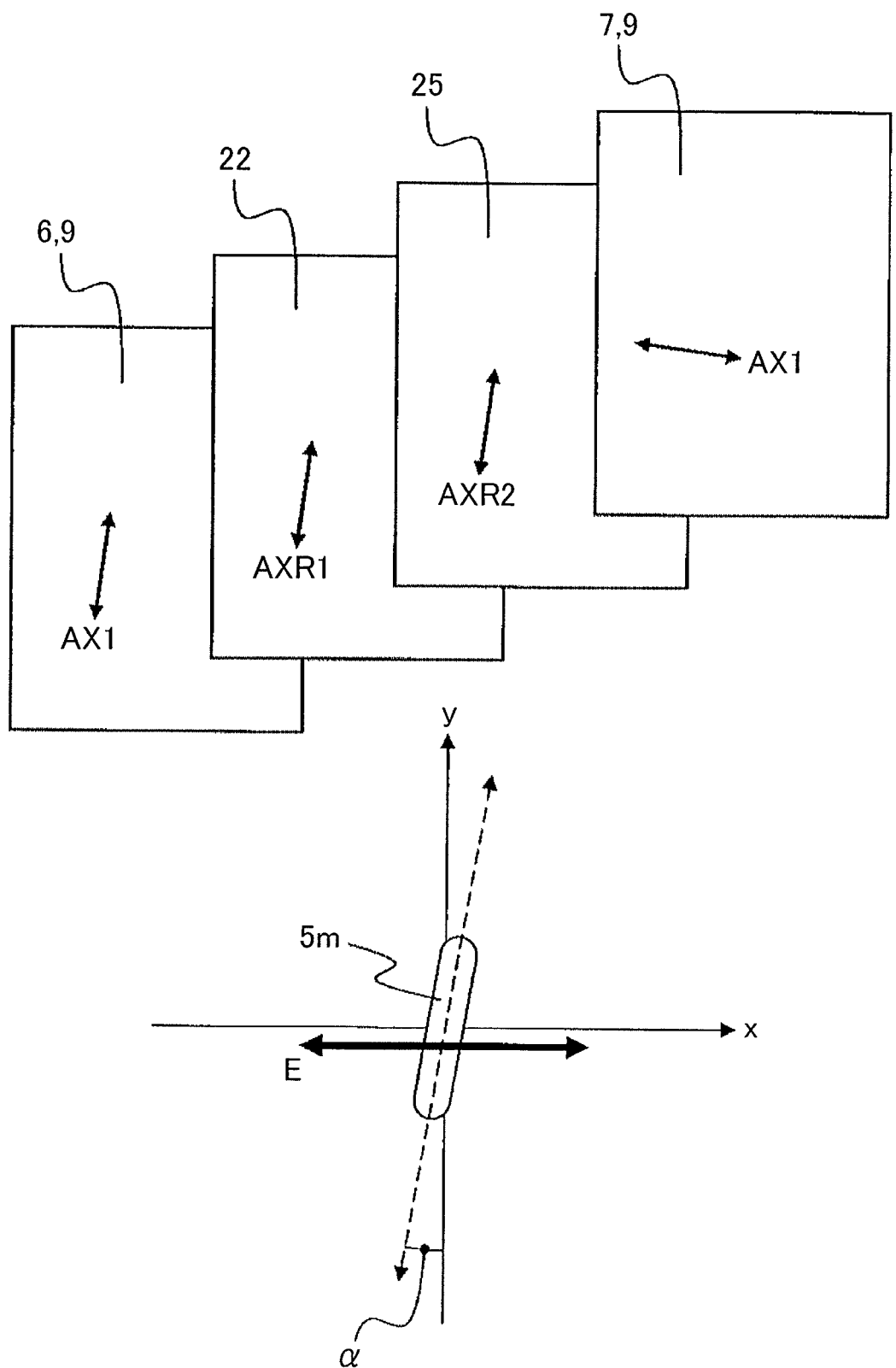
FIG. 9 is a schematic view showing one example of the relationship between an absorption axis of the thin film polarizer and the alignment direction of an alignment layer.

FIG. 5 is a schematic cross-sectional view showing one example of the cross-section constitution of the liquid crystal display panel to which the thin film polarizer of the embodiment 1 is applied. FIG. 6 is a schematic plan view showing one example of the planar constitution of a pixel of the first substrate. FIG. 7 is a schematic cross-sectional view showing one example of the cross-sectional constitution of the liquid crystal display panel taken along a line B-B' in FIG. 6. FIG. 8 is a schematic plan view for explaining the manner of change of alignment of the liquid crystal layer. FIG. 9 is a schematic view showing one example of the relationship between the absorption axis of the thin film polarizer and the alignment direction of the alignment layer.

When the thin film polarizer of the embodiment 1 is applied to the liquid crystal display panel 1, the liquid crystal display panel 1 takes the cross-sectional constitution shown in FIG. 5, for example.

The first substrate 3 includes a first insulation substrate 301 which is formed of transparent substrate such as a glass substrate or the like, and a first thin film laminated body 302 which is formed on one main surface of the first insulation substrate 301. Here, the first substrate 3 is the so-called TFT substrate as described previously, and the first thin film laminated body 302 includes, for example, scanning signal lines, video signal lines, TFT elements, pixel electrodes, a plurality of insulation layers, an alignment layer and the like. Further, the first substrate 3 is arranged such that the first thin film laminated body 302 is sandwiched between the first insulation substrate 301 and the liquid crystal layer 5. The first thin film polarizer 6 (polarization element film 9 and the reflection preventing layer 10a) is directly formed on a main surface of the first insulation substrate 301 on a side opposite to the main surface of the first insulation substrate 301 which faces the liquid crystal layer 5.

The second substrate 4 includes a second transparent insulation substrate 401 which is formed of a glass substrate or the like and a second thin film laminated body 402 which is formed on one main surface of the second insulation substrate 401. Here, the second substrate 4 is the so-called counter substrate as described previously, and the second thin film laminated body 402 includes, for example, a black matrix, color filters, a leveling layer, an alignment layer and the like. Further, the second substrate 4 is arranged such that the second thin film laminated body 402 is sandwiched between the second insulation substrate 401 and the liquid crystal layer 5. The second thin film polarizer 7 (the polarization element film 9 and the reflection preventing layer 10a) is directly formed on a main surface of the second insulation substrate 401 on a side opposite to the main surface of the second insulation substrate 401 which faces the liquid crystal layer 5.

The thin film polarizer of the embodiment 1 is, as described previously, applicable irrespective of the constitution of the pixel of the liquid crystal display panel 1, that is, irrespective of the constitution of the first thin film laminated body 302 and the second thin film laminated body 402. Accordingly, in the embodiment 1, as one constitutional example of the pixel, the constitution shown in FIG. 6 and FIG. 7 is named.

The constitution shown in FIG. 6 and FIG. 7 is an example of the constitution of a pixel driven by a liquid crystal driving method referred to as an IPS (In-Plane Switching) method, and a pixel electrode 11 and a common electrode 12 used for driving of the liquid crystal layer 5 (control of alignment) are formed on the first substrate 3 (first thin film laminated body 302). The first thin film laminated body 302 includes the background layer 13, the semiconductor layer 14 of the TFT element, the first insulation layer 15, the scanning signal line 16, the second insulation layer 17, the video signal line 18 and the source-drain electrode 19 of the TFT element, the third insulation layer 20, the common electrode 12, the fourth insulation layer 21, the pixel electrode 11, the first alignment layer 22 and the like. Here, the common electrode 12 and the pixel electrode 11 are laminated by way of the fourth insulation layer 21, and the pixel electrode 11 which is closer to the liquid crystal layer 5 has a comb-teeth shape as viewed in a plan view.

The second thin film laminated body 402 provided to the second substrate 4 includes the black matrix 23 (light shielding film), the color filters FR, FG, FB, the leveling layer 24, the second alignment layer 25 and the like.

The liquid crystal layer 5 is formed by filling nematic liquid crystal having positive dielectric anisotropy such that the alignment of liquid crystal molecules when no electric field is applied, that is, when the pixel electrode 11 and the common electrode 12 have the same potential becomes the homogeneous alignment. When teeth portions of the comb-teeth-shaped pixel electrode 11 extend in the direction (y direction) along which the video signal lines 18 extend as shown in FIG. 6, the orientation of the liquid crystal layer 5 when no electric field is applied is set such that, for example, as shown in FIG. 8A, a long axis direction of liquid crystal molecules 5m is tilted by several degrees (for example, 7 degrees to 15 degrees) with respect to the direction that the teeth portions of the pixel electrode 11 extend. When the potential difference is applied between the pixel electrode 11 and the common electrode 12 of such a pixel, an arcuate electric field E referred to as a fringe electric field E is applied to the liquid crystal layer 5. Here, when viewed from a plane of the substrate, as shown in FIG. 8B, for example, the fringe electric field E is applied in the direction (x direction) orthogonal to the y direction along which the teeth portions of the pixel electrode 11 extend. Accordingly, the liquid crystal molecules 5m are rotated so as to become parallel to the direction of the applied fringe electric field E. In the pixel driven by an IPS driving method, transmittance (luminance) of light in each pixel is controlled by making use of a change in an alignment state of the liquid crystal layer 5 generated by the rotation of the liquid crystal molecules 5m.

As a planar shape of the comb-teeth-shaped pixel electrode 11, various shapes have been known, and the direction that the teeth portions extend also varies. When the direction that the teeth portions extend is different from the y direction shown in FIG. 6, the long axis direction of the liquid crystal molecules 5m when an electric field is not applied becomes the direction which does not orthogonally intersect with the direction of a fringe electric field E as viewed in a plan view and makes a large angle with the direction of the fringe electric field E as viewed in a plan view.

Here, it is desirable to set the thickness d of the liquid crystal layer 5 to a value by which the retardation Δn·d when refractive index anisotropy of a liquid crystal material to be used is Δn becomes a ½ wavelength, that is, 275 nm with respect to light having a wavelength of 550 nm. However, in an actual liquid crystal display panel 1, the alignment of the liquid crystal molecules 5m is not uniformly changed. Accordingly, to acquire a brighter display, it is desirable to select the thickness d of the liquid crystal layer 5 such that the retardation Δn·d assumes a value slightly larger than a ½ wavelength, for example, a proper value within a range of 275 nm≤Δn·d≤400 nm with respect to a light having a wavelength of 550 nm.

The alignment of the liquid crystal layer 5 when an electric field is not applied is controlled based on the alignment direction of the first alignment layer 22 and the alignment direction of the second alignment layer 25. In the case of the liquid crystal display panel 1 having the pixel with the constitution shown in FIG. 6 to FIG. 8, the alignment direction AXR1 of the first alignment layer 22 and the alignment direction AXR2 of the second alignment layer 25 are set to the directions inclined by an angle α with respect to the direction orthogonal to the direction of the fringe electric field E as viewed in plane as shown in FIG. 9, for example. Although this angle α is set within a range from 5 degrees to 30 degrees in general, it is desirable to set the angle α within a range from 7 degrees to 15 degrees in view of the stability of alignment and luminance of a display.

Further, in an IPS method, assuming a display when an electric field is not applied as a dark display (so-called a normally black mode), the absorption axis direction AX1 of the first thin film polarizer 6 and the absorption axis direction AX1 of the second thin film polarizer 7 are arranged to intersect with each other orthogonally. Also in this case, either one of the absorption axis direction AX1 of the first thin film polarizer 6 and the absorption axis direction AX1 of the second thin film polarizer 7 is arranged parallel to the alignment direction AXR1 of the first alignment layer 22 and the alignment direction AXR2 of the second alignment layer 25, that is, the long axis direction of the liquid crystal molecules 5m when an electric field is not applied. Accordingly, in the example shown in FIG. 9, the absorption axis direction AX1 of the first thin film polarizer 6 is arranged parallel to the alignment direction AXR1 of the first alignment layer 22 and the alignment direction ARX2 of the second alignment layer 25. However, this embodiment is not limited to such an arrangement, and the absorption axis direction AX1 of the second thin film polarizer 7 may be arranged parallel to the alignment direction AXR1 of the first alignment layer 22 and the alignment direction AXR2 of the second alignment layer 25. It is needless to say that to enhance the utilization efficiency of light from the backlight unit 2, the direction of the absorption axis AX1 of the first thin film polarizer 6 may be arranged in the direction by which a transmission quantity of light from the backlight unit 2 is increased.

In the liquid crystal display panel 1 having the above-mentioned constitution, the white transmittance $TR_w$ is measured by driving the liquid crystal display panel 1 under the same condition with respect to a case where the thin film polarizers of the embodiment 1 is used as the first thin film polarizer 6 and the second thin film polarizer 7 and also with respect to a case where only the polarization element film 9 is formed as the first thin film polarizer 6 and the second thin film polarizer 7. A result of the measurement shows that the white transmittance when the thin film polarizer of the embodiment 1 having the reflection preventing layer 10a is higher than the white transmittance when only the polarization element film 9 is formed by 8%. Accordingly, it is safe to say that the transmittance of the liquid crystal display can be enhanced by applying the thin film polarizer of the embodiment 1 to the liquid crystal display panel 1.

As explained above, by applying the thin film polarizer of the embodiment 1 to the liquid crystal display panel 1, it is possible to suppress the reflection of an external light in the liquid crystal display having the backlight unit. The application of the thin film polarizer explained in conjunction with the embodiment 1 is not limited to a display panel which requires the thin film polarizer such as the liquid crystal display panel. For example, the thin film polarizer explained in conjunction with the embodiment 1 can be also used for suppressing the reflection of an external light (image reflection) in a plasma display or an organic EL display.

Further, by applying the thin film polarizer of the embodiment 1 to the liquid crystal display panel 1, it is possible to enhance contrast of the liquid crystal display having the backlight unit 2.

Embodiment 2

Figure 10:
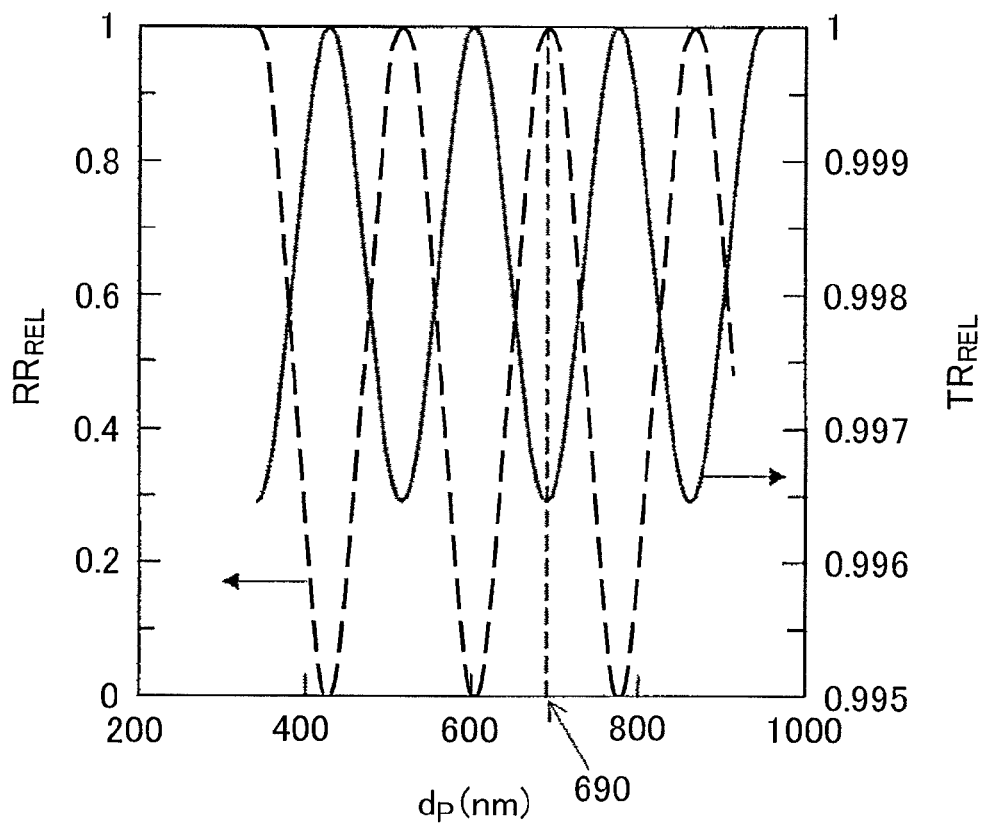
FIG. 10 is a graph showing the relationship among a film thickness, relative reflectance, and relative transmittance of a polarization element film of the thin film polarizer of the embodiment 1.

FIG. 10 is a graph showing the relationship among the film thickness, the relative reflectance and the relative transmittance of the polarization element layer in the thin film polarizer of the embodiment 1.

In the graph shown in FIG. 10, a film thickness $d_P$ (nm) of the polarization element film 9 is taken on an axis of abscissas, the relative reflectance $RR_{REL}$ is taken on a left-side axis of ordinates, and the relative transmittance $TR_{REL}$ is taken on a right-side axis of ordinates.

The relative reflectance $RR_{REL}$ (indicated by a broken line) and the relative transmittance $TR_{REL}$ (indicated by a solid line) shown in FIG. 10 are respectively values with light having a wavelength of 550 nm at which visual sensitivity of a viewer becomes the highest. Further, an absorption quantity of light by the polarization element film 9 is fixed irrelevant to the film thickness $d_P$.

The relative reflectance $RR_{REL}$, and the relative transmittance $TR_{REL}$ of the polarization element film 9 of the thin film polarizer of the embodiment 1, as shown in FIG. 10, respectively depend on the film thickness $d_P$ of the polarization element film 9 and change periodically. To observe the relative reflectance $RR_{REL}$ and the relative transmittance $TR_{REL}$ in the vicinity of a desired value of the film thickness $d_P$ of the polarization element film 9 explained in conjunction with the embodiment 1, that is, in the vicinity of 690 nm, the relative reflectance $RR_{REL}$ is high and the relative transmittance $TR_{REL}$ is small. This is because the film thickness $d_P$ (=690 nm) of the polarization element film 9 of the thin film polarizer explained in conjunction with the embodiment 1 is not a condition which allow lights to reinforce each other. That is, to allow the polarization element film 9 to acquire the maximum parallel transmittance, it is necessary to make the optimum film thickness $d_P$ of the polarization element film 9 and the interference condition which allow lights to reinforce each other agree with each other. A method which satisfies such requirement is explained hereinafter.

Figure 11:
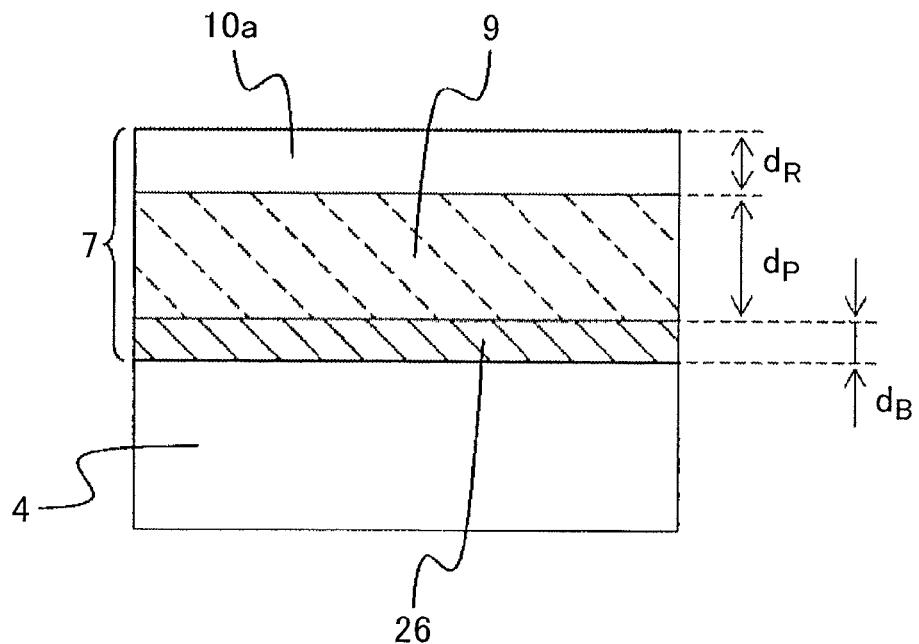
FIG. 11 is a schematic cross-sectional view showing one example of the cross-sectional constitution of a thin film polarizer according to an embodiment 2 of the present invention.

FIG. 11 is a schematic cross-sectional view showing one example of the cross-sectional constitution of the thin film polarizer of the embodiment 2 according to the present invention.

In the embodiment 2, the explanation is made by focusing on the second thin film polarizer 7, that is, the thin film polarizer remoter from the backlight unit 2 out of the first thin film polarizer 6 and the second thin film polarizer 7 provided to the liquid crystal display panel 1 shown in FIG. 1. For example, as shown in FIG. 11, the thin film polarizer 7 of the embodiment 2 includes a background layer 26 interposed between the second substrate 4 and the polarization element film 9 in addition to the polarization element film 9 and the reflection preventing layer 10a.

The background layer 26 is formed using a material which can control an interference condition where lights intensify each other by changing the film thickness $d_B$ in the thin film polarizer 7 where the thickness $d_P$ of the polarization element film 9 is set to a predetermined value (for example, 690 nm). Further, it is desirable that the background layer 26 is formed of, for example, a layer which has a refractive index substantially equal to the refractive index of the polarization element film 9 in the transmission axis direction, and it is also desirable that the difference between the refractive index of the background layer and the refractive index of the polarization element film in the transmission axis direction is −0.2 or more and 0.2 or less. This is because when the difference between the transmittance of the background layer 26 and the refractive index of the polarization element film 9 in the transmission axis direction is large, the undesired reflection occurs on an interface between the background layer 26 and the polarization element film 9 thus easily leading to the lowering of transmittance of the thin film polarizer 7.

The refractive index of the polarization element film 9 in the transmission axis direction used in the embodiment 1 is 1.6. Accordingly, to use such a polarization element film 9 as the polarization element film 9 of the thin film polarizer of the embodiment 2, it is desirable to set the refractive index of the background layer 26 to 1.6.

Here, it is desirable to form the background layer 26 using a material to which alignment process is applicable, for example. As an alignment process method, for example, a method in which a thin layer having surface uniformity is formed on a surface of a substrate and directivity is imparted to the thin layer, a method in which a thin layer is formed while imparting directivity to a surface of a substrate or the like can be named.

Among these alignment process methods, as the former method, for example, a method in which the imparting of directivity is performed at the time of forming a first alignment layer 22 and a second alignment layer 25 can be used. In this method, firstly, for example, a polymer such as a polyamic acid monomer which is a precursor monomer of polyimide, a photo-curing resin monomer, polyester or the like is applied to the second substrate 4 in a solution state by coating, and post treatment such as drying is performed thus forming a thin layer having surface uniformity. Thereafter, for example, directivity is imparted to a portion or the whole surface of the thin layer by a method such as rubbing of the thin layer using a rayon cloth or the like, or the irradiation of ultraviolet rays or electromagnetic beams such as electron beams.

To be more specific, for example, firstly, a polyimide film is formed on the glass substrate by forming a coating film (for example, having a thickness of 500 nm to 2000 nm) by applying a polyamic acid (for example, SUNEVER 610 made by Nissan Chemical Industries, Ltd. or the like) using spin coating, slot die coating or the like, by preheating the coating film at a temperature of 100° C. to 150° C. and, thereafter, by causing a dehydration condensation reaction at a temperature of 200° C. to 300° C. Thereafter, the glass substrate on which the polyimide film is formed is fixed, a roller (a diameter being 30 mm to 100 mm, for example) around which a rubbing cloth (made of polyethylene, rayon, cotton or the like, for example) is wound is pressed to the glass substrate with a fixed pressing amount (0.2 mm to 1 mm, for example), and the roller is rotated at a predetermined rotational speed (100 rpm to 5000 rpm, for example) while moving the glass substrate at a predetermined speed (3 mm/second to 500 mm/second, for example) thus applying alignment process to the polyimide film. Here, as a material for a background layer, polyester, polyvinyl alcohol, poly acetate or the like may be used besides polyimide.

As the latter method, a method in which the oblique vapor deposition of oxide silicon is applied to a surface of a substrate, a method in which a resin thin film is transferred to a surface of a substrate by rubbing a resin member made of polytetrafluoroethylene on a surface of a substrate in one direction, a method in which a substrate made of polymer is stretched in the uniaxial direction or the like can be named.

Figure 12:
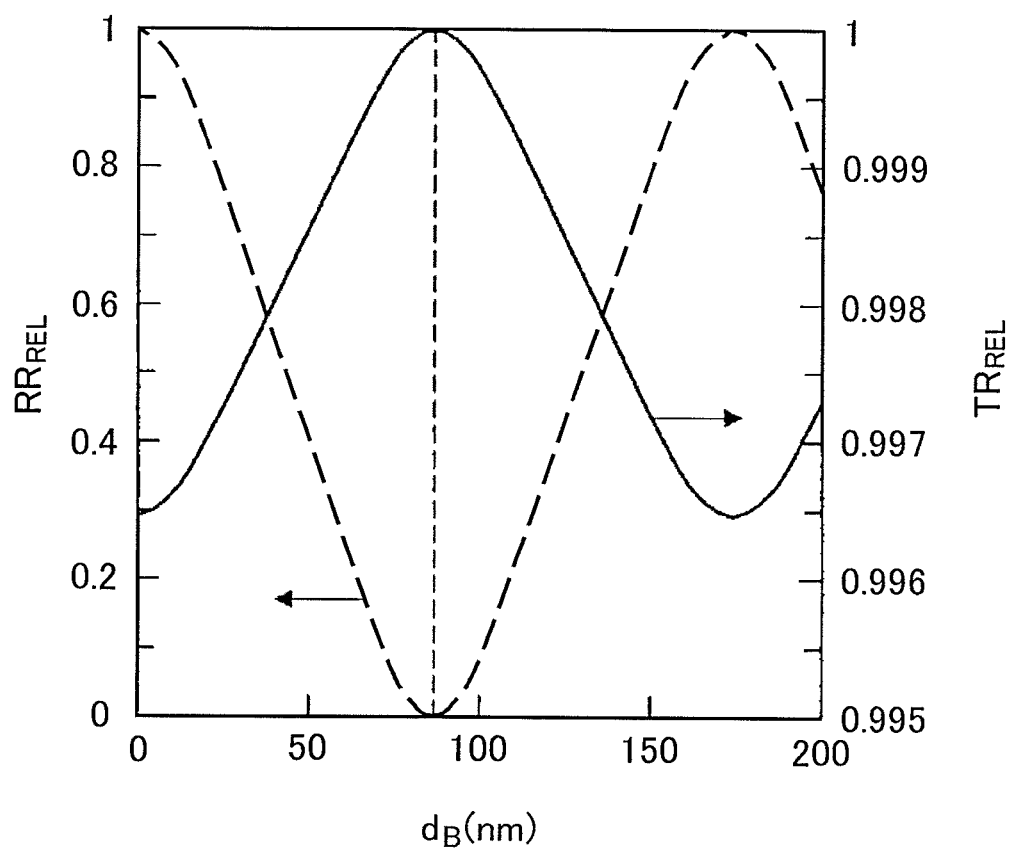
FIG. 12 is a graph for explaining a proper film thickness of a background layer of the thin film polarizer according to the embodiment 2.

FIG. 12 is a graph for explaining a suitable film thickness of the background layer of the thin film polarizer of the embodiment 2.

In the graph shown in FIG. 12, a film thickness $d_B$(nm) of the background layer 26 is taken on an axis of abscissas, relative reflectance $RR_{REL}$ is taken on a left-side axis of ordinates and relative transmittance $TR_{REL}$ is taken on a right-side axis of ordinates.

Further, the graph shown in FIG. 12 shows relative reflectance and relative transmittance in a case where a film thickness $d_P$ and a refractive index in the transmission axis direction of the polarization element film 9 are set to 690 nm and 1.6 respectively, a film thickness $d_R$ and a refractive index of the reflection preventing layer 10a are set to 137.5 nm (¼ of 550 nm) and 1.3 respectively, the refractive index of the substrate as 1.5, and the refractive index of the background layer 26 is set to 1.6.

As can be understood from FIG. 12, when the thin film polarizer of the embodiment 2 adopts the constitution (film thickness and refractive index) which satisfy the above-mentioned conditions, the relative reflectance $RR_{REL}$ and the relative transmittance $TR_{REL}$ of the thin film polarizer respectively depend on the film thickness $d_B$ of the background layer 26. When the film thickness $d_B$ of the background layer 26 is approximately 90 nm, the relative reflectance $RR_{REL}$ of the thin film polarizer becomes the smallest and the relative transmittance $TR_{REL}$ becomes the largest. Accordingly, when the constitution (film thickness and refractive index) of the thin film polarizer of the embodiment 2 satisfies the above-mentioned conditions, by setting the film thickness $d_B$ of the background layer 26 to approximately 90 nm, it is possible to make the optimum film thickness $d_P$ (=690 nm) of the polarization element film 9 and the interference condition which allows lights to reinforce each other agree with each other.

Further, by irradiating light to the thin film polarizer of the embodiment 2 in which the film thickness and the transmittance are set to satisfy the above-mentioned conditions, and by studying the relative reflectance when the light is irradiated from the reflection preventing layer 10a side, a following result shown in Table 3 is obtained.

TABLE 3

|  | $RR_{REL}$ | |
| --- | --- | --- |
|  | ∥AX2 | ∥AX1 |
| COM1 | 1 | 1 |
| PRAC3 | 0.01> | 0.06 |

In Table 3, COM1 indicates a thin film polarizer of a comparison example 1 in which only a polarization element film 9 having a film thickness $d_p$ of approximately 690 nm is formed on a surface of a glass substrate, and PRAC2 indicates the thin film polarizer of the example 2, that is, the thin film polarizer in which the background layer 26 having a film thickness $d_B$ of approximately 90 nm (refractive index being 1.6), the polarization element film 9 having a film thickness $d_p$ of approximately 690 nm (refractive index in the transmission axis direction being 1.6, and refractive index in the absorption axis direction being 1.9), and the reflection preventing layer 10a having a film thickness $d_R$ of approximately 137.5 nm (refractive index being 1.3) are laminated to the surface of the glass substrate. $RR_{REL}$ indicates relative reflectance in a case where reflectance of light on the thin film polarizer of the comparison example 1 is set to 1. Table 3 shows the reflectance of light having a wavelength of 550 nm. ∥AX2 indicates relative reflectance of light whose incident plane is parallel to the transmission axis direction of the polarization element film 9, and ∥AX1 indicates relative reflectance of light whose incident plane is parallel to the absorption axis direction of the polarization element film 9.

As can be understood from Table 3, in the thin film polarizer of the embodiment 2, the relative reflectance in the transmission axis direction is approximately 0% so that the thin film polarizer of the embodiment 2 can suppress the reflection of light more effectively than the thin film polarizer of the embodiment 1 suppresses.

When the relative transmittance and a dichroic ratio when light is irradiated to the thin film polarizer from a glass substrate side are studied, a following result shown in Table 4 is obtained.

TABLE 4

|  | $TR_{REL}$ | | |
| --- | --- | --- | --- |
|  | $TR_∥$ | $TR_⊥$ | $DR_{REL}$ |
| COM1 | 1 | 1 | 1 |
| PRAC3 | 1.04 | 1.12 | 1.37 |

Also in Table 4, COM1 indicates the thin film polarizer of a comparison example 1, and PRAC2 indicates the thin film polarizer of the embodiment 2. $TR_{REL}$ indicates relative transmittance in a case where the transmittance of the thin film polarizer of the comparison example 1 is set to 1. Table 4 shows the transmittance of light having a wavelength of 550 nm. Further, $TR_∥$ indicates parallel transmittance and $TR_⊥$ indicates orthogonal transmittance. A dichroic ratio $DR_{REL}$ is a value expressed by the formula 2 described previously.

As can be understood from Table 4, the parallel transmittance $TR_∥$ of the thin film polarizer of the embodiment 2 becomes approximately 4% higher than the parallel transmittance $TR_∥$ of the thin film polarizer of the comparison example 1, and the dichroic ratio $DR_{REL}$ of the thin film polarizer of the embodiment 2 becomes 37% higher than the dichroic ratio $DR_{REL}$ of the thin film polarizer of the comparison example 1. Accordingly, it is safe to say that the thin film polarizer of the embodiment 2 can enhance the parallel transmittance and the effective dichroic ratio.

In the above-mentioned explanation with respect to the thin film polarizer of this embodiment 2, only the thin film polarizer which is directly formed on the surface of the transparent substrate is considered. However, when the thin film polarizer of the embodiment 2 is applied to the liquid crystal display panel 1, the transmittance of light in the liquid crystal display panel 1 is not decided based on only the thin film polarizer but is influenced by various constitutional members which the liquid crystal display panel 1 includes. In view of the above, the transmittance of light when the thin film polarizer of the embodiment 2 is applied to the liquid crystal display panel 1 and the like are explained.

Figure 13:
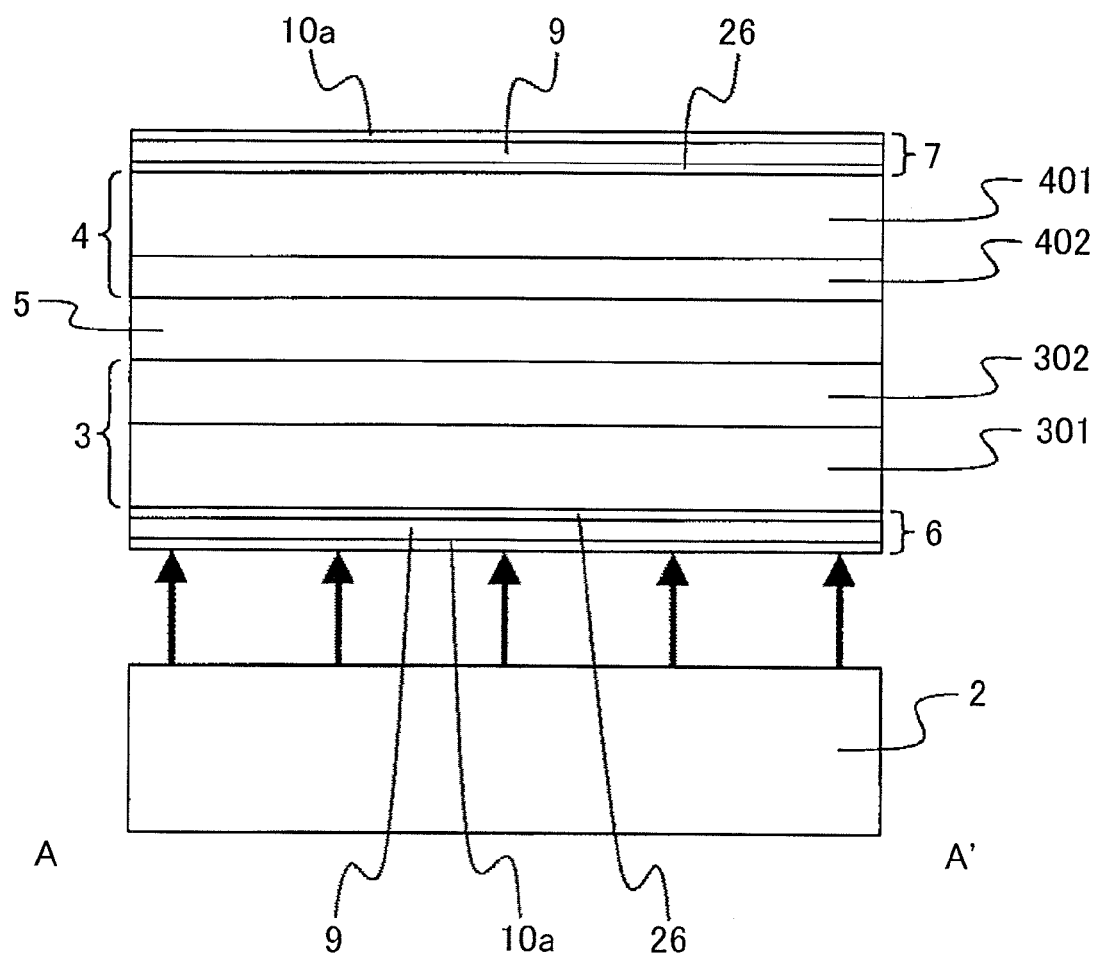
FIG. 13 is a schematic cross-sectional view showing one example of the cross-sectional constitution of a liquid crystal display panel to which the thin film polarizer according to the embodiment 2 is applied.

FIG. 13 is a schematic cross-sectional view showing one example of the cross-sectional constitution of the liquid crystal display panel to which the thin film polarizer of the embodiment 2 is applied.

When the thin film polarizer of the embodiment 2 is applied to the liquid crystal display panel 1, the liquid crystal display panel 1 has the cross-sectional constitution shown in FIG. 13, for example.

A first substrate 3 includes a first insulation substrate 301 which is formed of a transparent substrate such as a glass substrate or the like, and a first thin film laminated body 302 which is formed on one main surface of the first insulation substrate 301. Here, the first thin film laminated body 302 is arranged between the first insulation substrate 301 and a liquid crystal layer 5. Further, a first thin film polarizer 6 (including a background layer 26, a polarization element film 9 and a reflection preventing layer 10a) is directly formed on a main surface of the first insulation substrate 301 on a side opposite to a main surface of the first insulation substrate 301 which faces the liquid crystal layer 5.

A second substrate 4 includes a second insulation substrate 401 which is formed of a transparent substrate such as a glass substrate or the like, and a second thin film laminated body 402 which is formed on one main surface of the second insulation substrate 401. Here, the second thin film laminated body 402 is arranged between the second insulation substrate 401 and the liquid crystal layer 5. Further, a second thin film polarizer 7 (including a background layer 26, a polarization element film 9 and a reflection preventing layer 10a) is directly formed on a main surface of the second insulation substrate 401 on a side opposite to the main surface of the second insulation substrate 401 which faces the liquid crystal layer 5.

In the liquid crystal display panel 1 having the above-mentioned constitution, the pixel is constituted as shown in FIG. 6 to FIG. 8. Then, the white transmittance $TR_w$ is measured in a state where the liquid crystal display panel 1 is driven under the same conditions with respect to a case where the first thin film polarizer 6 and the second thin film polarizer 7 have the constitution (film thickness and refractive index) under the above-mentioned condition and also with respect to a case where only the polarization element film 9 is formed as the thin film polarizer. A result of the measurement shows that the white transmittance in the case where the thin film polarizer of the embodiment 2 is used is higher than the white transmittance in the case where only the polarization element film 9 is formed by 9%. Accordingly, it is safe to say that the transmittance of the liquid crystal display can be enhanced by applying the thin film polarizer of the embodiment 2 to the liquid crystal display panel 1.

As has been explained above, by applying the thin film polarizer of the embodiment 2 to the liquid crystal display panel 1, it is possible to further suppress the reflection of an external light in the liquid crystal display.

Further, by applying the thin film polarizer of the embodiment 2 to the liquid crystal display panel 1, it is possible to enhance contrast of the liquid crystal display having the backlight unit 2.

Embodiment 3

In the embodiment 1 and the embodiment 2, the reflection preventing layer 10a in which inorganic fine particles having a low refractive index such as magnesium fluoride fine particles are dispersed as binders is used as the protection layer which is formed on the polarization element film 9 so that the reflection of an external light in the liquid crystal display can be suppressed and, at the same time, it is possible to enhance contrast.

Contrast of the thin film polarizer is enhanced by increasing parallel transmittance and by lowering orthogonal transmittance. The parallel transmittance can be increased by suppressing the reflectance in the transmission axis direction, and the orthogonal transmittance can be lowered by increasing the reflectance in the absorption axis direction. To realize the above, it is preferable to use a layer whose refractive index differs in plane (hereinafter referred to as an anisotropic layer) as the protection layer which is formed on the polarization element film 9, for example. By forming the anisotropic layer having the refractive index which differs in plane on the polarization element film 9, the structure can satisfy both the condition for lowering the reflectance of the thin film polarizer in the transmission axis direction and the condition for increasing the reflectance of the thin film polarizer in the absorption axis direction.

FIG. 14 is a schematic exploded perspective view showing one example of the schematic constitution of a thin film polarizer according to an embodiment 3 of the present invention.

Also in the embodiment 3, the explanation is made by focusing on a second thin film polarizer 7, that is, a thin film polarizer remoter from a backlight unit 2, out of a first thin film polarizer 6 and the second thin film polarizer 7 which are formed on the liquid crystal display panel 1 shown in FIG. 1. The thin film polarizer 7 of the embodiment 3 is, as shown in FIG. 14, contained of a polarization element film 9 which is directly formed on a second substrate 4 and an anisotropic layer 10b which is formed on the polarization element film 9, for example. In FIG. 14, symbols AX1, AX2 indicate the absorption axis direction and the transmission axis direction of the polarization element film 9 respectively, and symbols AX3, AX4 indicate the phase delay axis direction and the phase advance axis direction of the anisotropic layer 10b respectively.

It is sufficient for the polarization element film 9 to have the constitution explained in conjunction with the embodiment 1 and hence, the detailed explanation of the polarization element film 9 is omitted here.

The anisotropic layer 10b is a layer having the refractive index which differs in plane as described above, and is formed such that the phase delay axis direction AX3 of the anisotropic layer 10b is parallel to the absorption axis direction AX1 of the polarization element film 9. The phase delay axis direction AX3 is the in-plane direction of the anisotropic layer along which a refractive index is large. The direction AX4 which is orthogonal to the phase delay axis direction AX3 is the direction along which the refractive index is smaller than the refractive index in the phase delay axis direction AX3, and the direction AX4 is referred to as the phase advance axis direction in the explanation made hereinafter.

Figure 16:
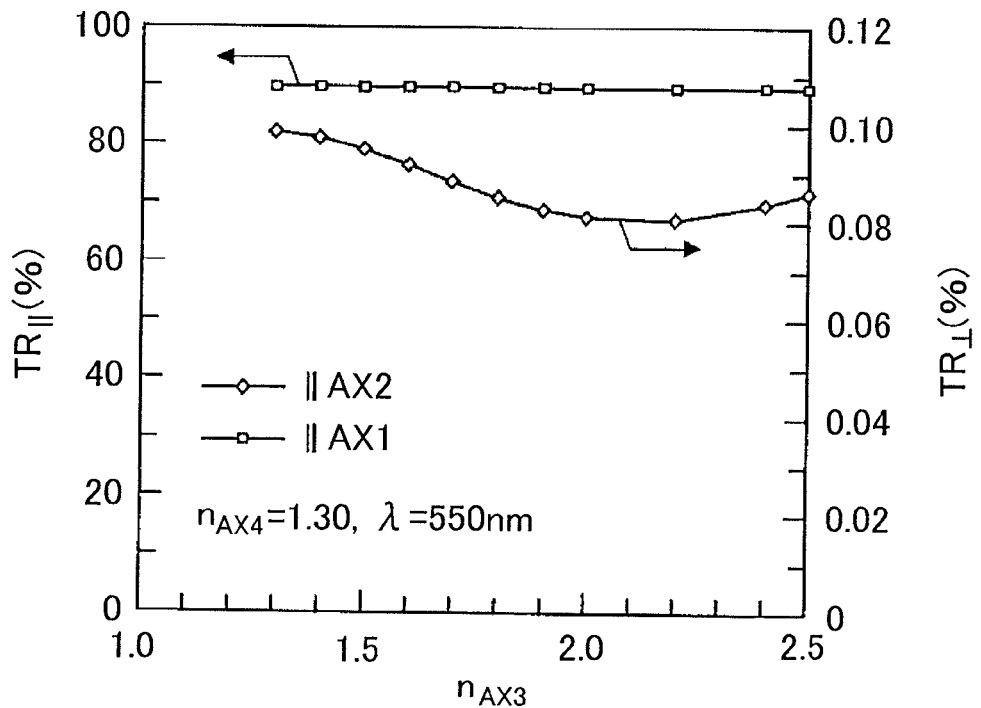
FIG. 16 is a graph showing the relationship among a refractive index, parallel transmittance, and orthogonal transmittance of the anisotropic layer in the phase delay axis direction.
Figure 17:
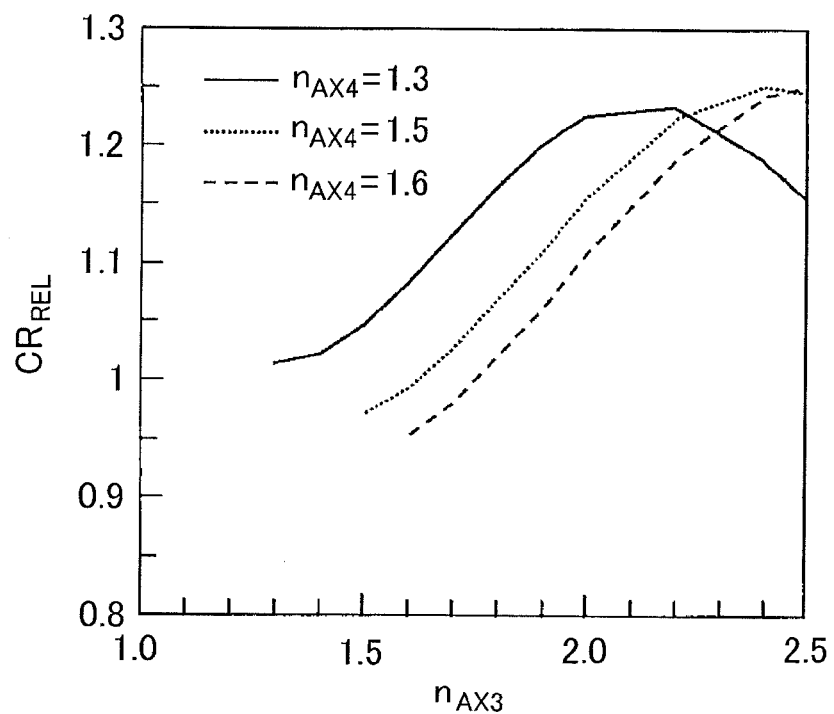
FIG. 17 is a graph showing the relationship among a refractive index in the phase delay axis direction, a refractive index in the phase advance axis direction, and contrast.

FIG. 15 to FIG. 17 are graphs for explaining one example of a method of setting a refractive index of the anisotropic layer of the thin film polarizer of the embodiment 3.

FIG. 15 is a graph showing the relationship between a refractive index $n_{AX3}$ and relative reflectance RR of the anisotropic layer in the phase delay axis direction. FIG. 16 is a graph showing the relationship among a refractive index $n_{AX3}$, parallel transmittance $TR_{\parallel}$, and orthogonal transmittance $TR_{\perp}$ of the anisotropic layer in the phase delay axis direction. FIG. 17 is a graph showing the relationship among a refractive index $n_{AX3}$ in the phase delay axis direction, a refractive index $n_{AX4}$ in the phase advance axis direction, and relative contrast $CR_{REL}$.

The phase advance axis direction AX4 of the anisotropic layer 10b of the thin film polarizer of the embodiment 3 is approximately parallel to the transmission axis direction AX2 of the polarization element film 9. Accordingly, when a refractive index of the polarization element film 9 in the transmission axis direction AX2 is 1.6, it is desirable to set the refractive index $n_{AX4}$ of the anisotropic layer 10b in the phase advance axis direction AX4 to 1.3 which is induced from the formula 1 and satisfies a non-reflection condition. By setting the refractive index $n_{AX4}$ to 1.3, the reflectance of light in the transmission axis direction AX2 of the polarization element film 9 can be made small and hence, it is possible to increase the parallel transmittance.

On the other hand, the orthogonal transmittance can be decreased by increasing the refractive index $n_{AX3}$ of the anisotropic layer 10b in the phase delay axis direction AX3 which is the direction approximately parallel to the absorption axis direction AX1 of the polarization element film 9, for example. In view of the above, firstly, the refractive index $n_{AX4}$ of the anisotropic layer 10b in the phase advance axis direction AX4 is fixed to 1.3, and the reflectance is measured while changing the refractive index $n_{AX3}$ in the phase delay axis direction AX3. The result shown in FIG. 15 is obtained.

In the graph shown in FIG. 15, the refractive index $n_{AX3}$ of the anisotropic layer 10b in the phase delay axis direction AX3 is taken on an axis of abscissas, and the reflectance RR (%) of light having a wavelength of 550 nm is taken on an axis of ordinates. Further, in the graph shown in FIG. 15, reflectance of the polarization element film 9 in the transmission axis direction AX2 (that is, in the phase advance axis direction AX4 of the anisotropic layer 10b) and reflectance of the polarization element film 9 in the absorption axis direction AX1 (that is, in the phase delay axis direction AX3 of the anisotropic layer 10b) are shown. Further, the polarization element film 9 has the constitution explained in conjunction with the embodiment 1, and a refractive index is set to 1.6 and a film thickness $d_p$ is set to 690 nm. Further, a film thickness of the anisotropic layer 10b is set to a film thickness which is sufficient for suppressing the lowering of the parallel transmittance of the thin film polarizer. That is, the film thickness of the anisotropic layer 10b is set to a film thickness which is determined using the absorption axis direction AX1 of the anisotropic layer 10b as the reflection preventing condition. For example, the film thickness of the anisotropic layer 10b is set to a film thickness which is ($¼n_{AX4}$) times as long as 550 nm which is a wavelength of light giving the highest visual sensitivity to a viewer.

As can be understood from FIG. 15, the reflectance RR of the polarization element film 9 in the transmission axis direction AX2 is substantially constant irrespective of the magnitude of the refractive index $n_{AX3}$ of the anisotropic layer 10b in the phase delay axis direction AX3. Further, the reflectance RR of the polarization element film 9 is extremely small. On the other hand, the reflectance RR of the polarization element film 9 in the absorption axis direction AX1 exhibits a maximum value when the refractive index $n_{AX3}$ of the anisotropic layer 10*b* in the phase delay axis direction AX3 takes a value in the vicinity of 2.1 to 2.2. In this manner, it is considered that when the refractive index $n_{AX3}$ of the anisotropic layer 10*b* in the phase delay axis direction AX3 is increased, the reflectance of the polarization element film 9 in the absorption axis direction AX1 is increased so that the orthogonal transmittance is lowered.

Next, the relationship between the refractive index $n_{AX3}$ of the anisotropic layer 10*b* in the phase delay axis direction AX3 and the parallel transmittance and the orthogonal transmittance of the thin film polarizer is studied, and the result shown in FIG. 16 is obtained, for example.

In the graph shown in FIG. 16, the refractive index $n_{AX3}$ of the anisotropic layer 10*b* in the phase delay axis direction AX3 is taken on an axis of abscissas, the parallel transmittance $TR_{\parallel}$ (%) is taken on a left-side axis of ordinates, and the orthogonal transmittance $TR_{\perp}$ (%) is taken on a right-side axis of ordinates. Further, the constitution of the thin film polarizer is equal to the constitution of the thin film polarizer which is used in the measurement of the reflectance shown in FIG. 15.

Further, the parallel transmittance $TR_{\parallel}$ and the orthogonal transmittance $TR_{\perp}$ shown in FIG. 16 are values which are obtained by setting a value of the parallel transmittance $TR_{\parallel}$ and a value of the orthogonal transmittance $TR_{\perp}$ which are obtained assuming that the reflectance is 0% to 90% and 0.1% respectively (that is, contrast being 900) and by subtracting an amount corresponding to the reflectance of light from these transmittances As can be understood from FIG. 16, the parallel transmittance $TR_{\parallel}$ (the transmittance of the polarization element film 9 in the transmission axis direction AX2) is substantially constant irrespective of the magnitude of the refractive index $n_{AX3}$ of the anisotropic layer 10*b* in the phase delay axis direction AX3. Further, the parallel transmittance $TR_{\parallel}$ is large, that is, approximately 90%. On the other hand, the orthogonal transmittance $TR_{\perp}$ (the transmittance of the polarization element film 9 in the absorption axis direction AX1) exhibits a minimum value when the refractive index $n_{AX3}$ of the anisotropic layer 10*b* in the phase delay axis direction AX3 takes a value in the vicinity of 2.1 to 2.2. In this manner, it is safe to say that the thin film polarizer of the embodiment 3 can decrease the orthogonal transmittance while suppressing the lowering of the parallel transmittance. Accordingly, it is expected that the thin film polarizer of the embodiment 3 can enhance the contrast.

Next, the relationship among the refractive index of the anisotropic layer 10*b* in the phase delay axis direction AX3, the refractive index of the anisotropic layer 10*b* in the phase advance axis direction AX4 and the contrast is studied, and the result shown in FIG. 17 is obtained, for example.

In the graph shown in FIG. 17, the refractive index $n_{AX3}$ of the anisotropic layer 10*b* in the phase delay axis direction AX3 is taken on an axis of abscissas, and relative contrast $CR_{REL}$ is taken on an axis of ordinates. With respect to the relative contrast $CR_{REL}$, contrast (900) which is calculated based on the parallel transmittance and the orthogonal transmittance obtained when there is no reflection is set to 1. FIG. 17 also shows the relationship among the refractive index $n_{AX3}$ in the phase delay axis direction AX3, the refractive index $n_{AX4}$ in the phase advance axis direction AX4, and the contrast $CR_{REL}$ in cases where the refractive index $n_{AX4}$ in the phase advance axis direction AX4 is set to 1.3, 1.5 and 1.6 respectively.

As can be understood from FIG. 17, in all cases, along with the increase of the refractive index $n_{AX3}$ in the phase delay axis direction AX3, the relative contrast $CR_{REL}$ of the thin film polarizer is enhanced approximately 1.2 times. Accordingly, it is safe to say that the thin film polarizer of the embodiment 3 can enhance the contrast.

As a material for forming the anisotropic layer 10*b*, for example, a coating-type anisotropic material described in SID2009, Digest. P-113 is used. The material described in SID2009, Digest. P-113 is lyotropic liquid crystal material which is water-soluble and hence, there exists a possibility that when the anisotropic layer 10*b* is formed on the polarization element film 9, the polarization element film 9 is dissolved. The dissolving of the polarization element film 9 can be effectively prevented by applying the insolubilization treatment to the polarization element film 9. In applying the insolubilization treatment to the polarization element film 9, it is preferable to use a material described in JP 2009-199075 A, for example. By applying the insolubilization treatment to the polarization element film 9, the polarization element film 9 is not dissolved in water so that the polarization element film 9 can possess sufficient durability and a sufficient quality maintaining property.

The anisotropic layer 10*b* which is formed by reference to SID2009, Digest. P-113 or JP 2009-199075 A has, for example, the refractive index of 1.5 in the phase advance axis direction AX4 and the refractive index of 1.83 in the phase delay axis direction AX3. When the contrast of the thin film polarizer of the embodiment 3 which has such an anisotropic layer 10*b* is studied, it is found out that the thin film polarizer of the embodiment 3 can increase the contrast by approximately 8% compared with a thin film polarizer with no reflection. In this manner, the thin film polarizer in which the anisotropic layer 10*b* is formed on the polarization element film 9 can enhance the contrast. Accordingly, by applying the thin film polarizer of the embodiment 3 to the liquid crystal display panel 1, it is possible to enhance the contrast of the liquid crystal display.

Although the present invention has been explained in conjunction with embodiments heretofore, the present invention is not limited to the above-mentioned embodiments, and it is needless to say that various modifications are conceivable without departing from the gist of the present invention.

For example, the reflection preventing layer 10*a* which is explained in the embodiment 1 may be formed not only on the polarization element film which is soluble in water but also on a transparent resin substrate such as a polycarbonate resin substrate or an acrylic resin substrate. Accordingly, the application of the reflection preventing layer 10*a* explained in conjunction with the embodiment 1 is not limited to a display panel which requires the thin film polarizer such as the liquid crystal display panel. For example, the reflection preventing layer 10*a* explained in conjunction with the embodiment 1 can be used for suppressing the reflection of an external light (image reflection) in a self-luminous display which requires no thin film polarizer such as a plasma display or an organic EL display.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
   a first substrate;
   a second substrate;
   a first polarization element film which is formed on a surface of the second substrate on a side opposite to a side where the first substrate is arranged; and
   a first protection layer which is formed in contact with a surface of the first polarization element film on a side opposite to a side where the second substrate is arranged, wherein
   the first polarization element film is made of an aligned lyotropic liquid crystal material,
   the first protective layer is made of a material having a refractive index smaller than a refractive index of the first polarization element film in a transmission axis direction, and has a thickness smaller than a thickness of the first polarization element film, $(n_2/n_1)^2 = n_s/n_o$, where the $n_2$ is the refractive index of the first polarization element film in the transmission axis direction, the $n_1$ is the refractive index of the first protection layer, the $n_s$ is a refractive index of the second substrate, and the $n_o$ is a refractive index of air,
   the thickness of the first protection layer is at least 60 nm and no greater than 190 nm.

2. The display device according to claim 1, further comprising:
   a background layer which is interposed between the first polarization element film and the second substrate;
   wherein the background layer has orientation, and an alignment direction of the background layer is approximately parallel to an alignment direction of the lyotropic liquid crystal material.

3. The display device according to claim 2, wherein a difference between a refractive index of the background layer and a refractive index of the first polarization element film in the transmission axis direction is no greater than ±0.2.

4. The display device according to claim 1, wherein the lyotropic liquid crystal material is made of any one of an azo-series dye, an anthraquinone-series dye, perylene-series dye, an indanthrone-series dye, an imidazole-series dye or a mixture of the dyes.

5. The display device according to claim 1, further comprising:
   a second polarization element film which is directly formed on a surface of the first substrate on a side opposite to a side where the second substrate is arranged;
   the second polarization element film and the second protection layer formed on the first substrate have the same constitution as the first polarization element film and the first protection layer formed on the second substrate; and
   a transmission axis direction of the second polarization element film formed on the first substrate is substantially orthogonal to the transmission axis direction of the polarization element film formed on the second substrate.

6. The display device according to claim 1, further comprising:
   a liquid crystal display panel in which a liquid crystal layer is sandwiched between the first substrate and the second substrate; and
   a backlight unit which is arranged on a back surface side of the liquid crystal display panel.

* * * * *